(12) United States Patent
Ramanan et al.

(10) Patent No.: US 7,656,821 B2
(45) Date of Patent: Feb. 2, 2010

(54) TOPOLOGY DISCOVERY AND IDENTIFICATION OF SWITCHES IN AN N-STAGE INTERCONNECTION NETWORK

(75) Inventors: Aruna V. Ramanan, Poughkeepsie, NY (US); Alison B. White, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 11/421,237

(22) Filed: May 31, 2006

(65) Prior Publication Data

US 2007/0280134 A1 Dec. 6, 2007

Related U.S. Application Data

(60) Provisional application No. 60/796,802, filed on May 1, 2006.

(51) Int. Cl.
 *H04L 12/28* (2006.01)
(52) U.S. Cl. ...................................... 370/254

(58) Field of Classification Search .................. 370/254, 370/255, 363, 367, 368, 369, 370, 386, 387, 370/388, 400, 401, 422; 709/203, 219, 223, 709/224, 225, 226
See application file for complete search history.

*Primary Examiner*—Chirag G Shah
*Assistant Examiner*—Ashley L Shivers
(74) *Attorney, Agent, or Firm*—Scully, Scott, Murphy & Presser, P.C.; John E. Campbell

(57) ABSTRACT

A method of topology discovery and identification of switches enables a user to determine the topology of a N-stage switch network. The method includes ascertaining an intended topology of the N-stage switch network, creating a list of switch boards present in the N-stage switch network, and determining a switch board connection pattern. The method further includes classifying each of the switch boards as an outer switch board, or an inner switch board, and creating a list for each type of switch board, classifying each of the switch boards on the OB list as stage 1, stage 2, or unknown, classifying each of the switch boards on the IB list as stage 3 to stage N, grouping the stage 2 and stage 1 switch boards into sectors, and numbering each type of switch board, thereby obtaining a determined topology, and validating the determined topology by comparing it to the intended topology.

20 Claims, 32 Drawing Sheets

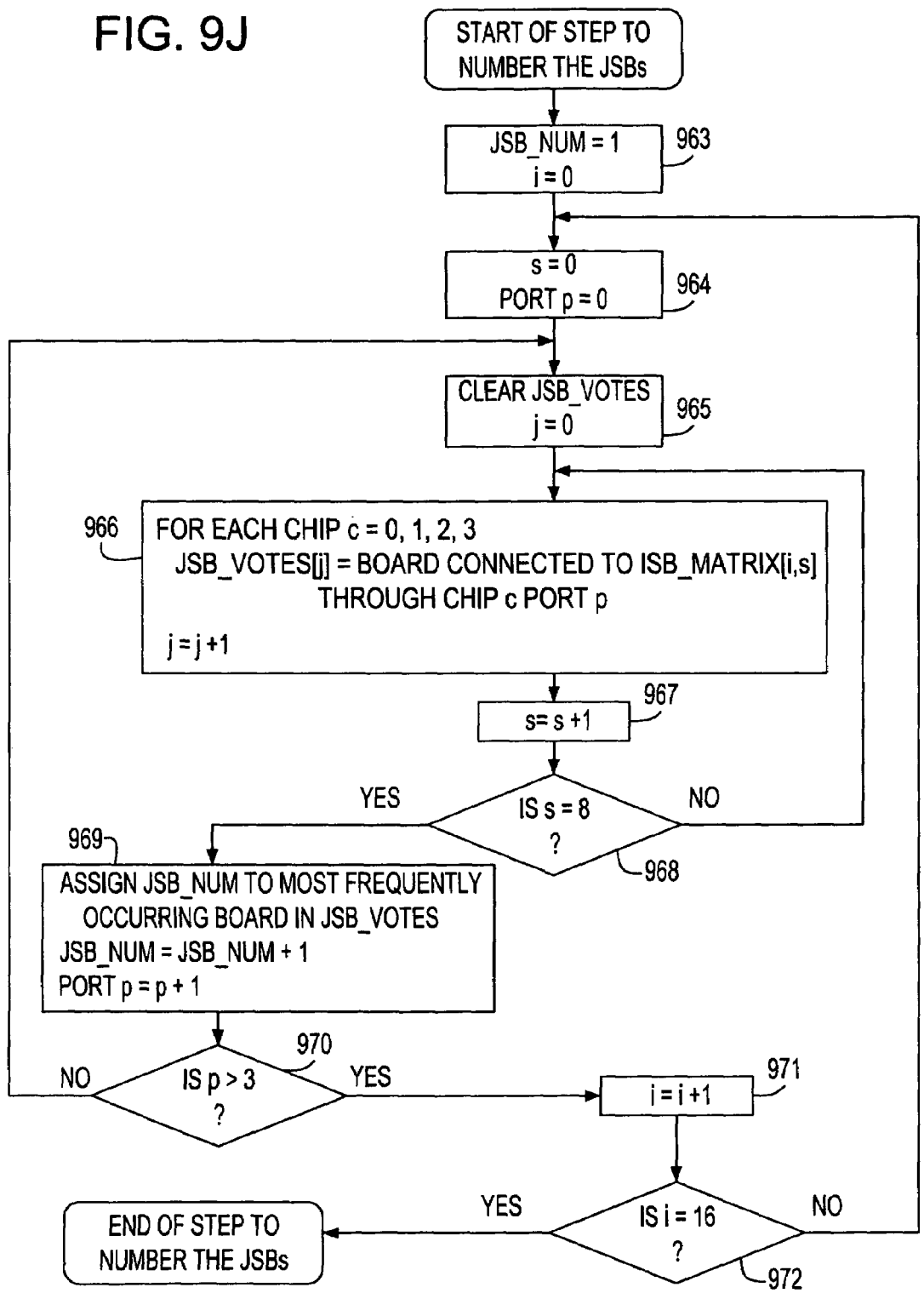

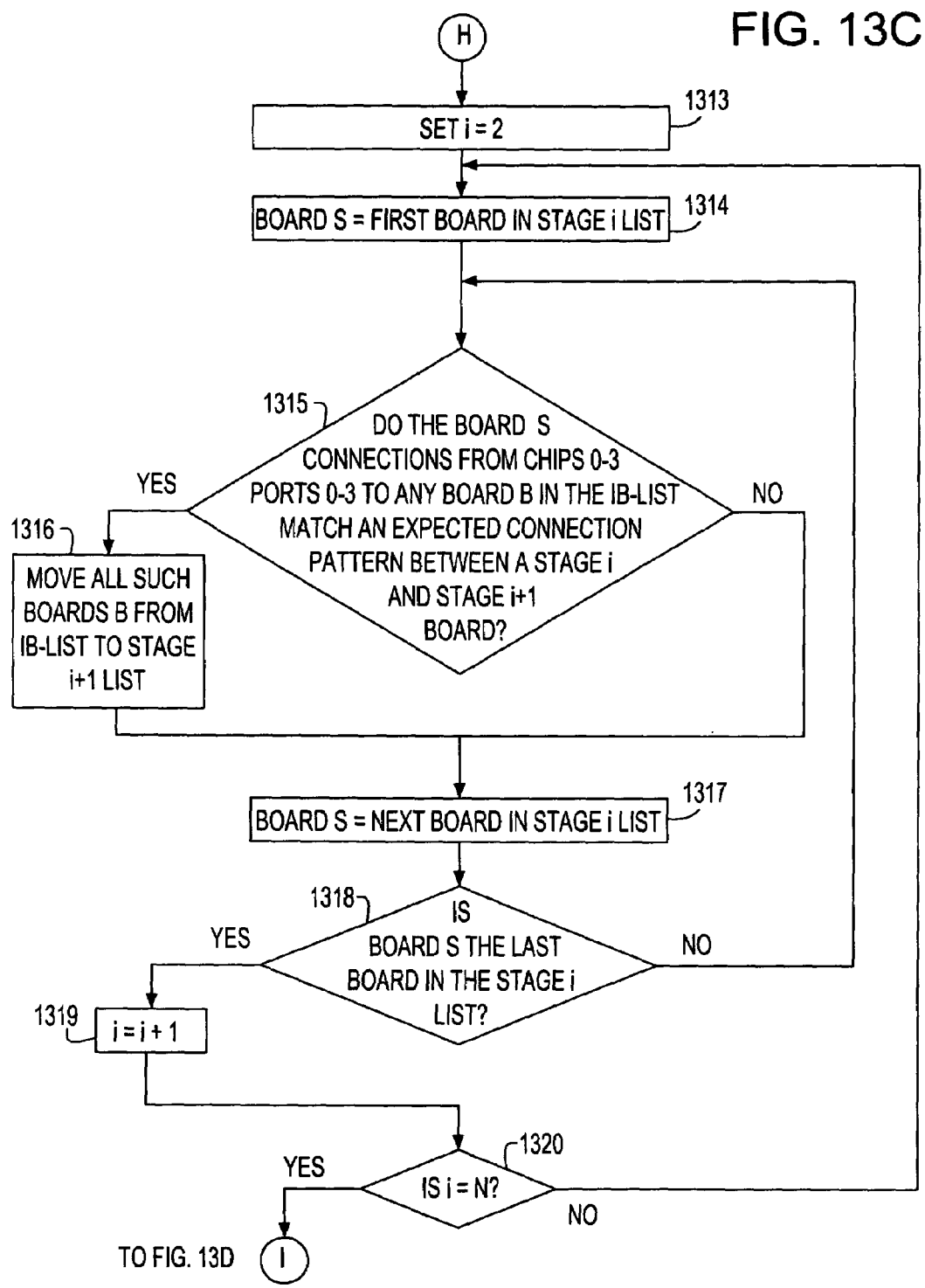

TOPOLOGY DISCOVERY AND IDENTIFICATION OF SWITCHES IN AN N-STAGE INTERCONNECTION NETWORK

CROSS-REFERENCE TO RELATED APPLICATIONS

This claims priority to, and the benefit of, Provisional U.S. Patent Application Ser. No. 60/796,802, filed May 1, 2006, and claims the benefit of Co-pending Non-Provisional U.S. patent application Ser. No. 11/421,186, filed herewith, and the entirety of both applications is incorporated herein by reference.

TECHNICAL FIELD

The invention relates generally to the field of network architecture, and more particularly to a system and method for network topology discovery and identification of switches in an N-stage interconnection network.

BACKGROUND INFORMATION

Communication networks are typically constructed using switching devices to provide end-to end connectivity between host computers. Often, such networks are created using switching devices, which are interconnected in some manner. Although each device included in a network has a physical identity, uniquely identifying each device based on the device's physical characteristics and location within the network is difficult. Logical identifiers, such as IP addresses, are defined to uniquely identify each device included in the network. A mechanism is used to map the physical devices to unique logical identifiers so that the defined identifiers can be used to refer to the physical devices. The type of logical identifier used depends on the type of network the physical devices connected. Often, different identifiers are used to identify the same device for different purposes.

A network that is used in high performance computing environments is constructed using switching elements, or switch boards, interconnected in a regular manner. Depending on the size of network, a varying number of switch boards are interconnected in multiple levels to form the network. The pattern of interconnection between the different levels of switches is regular and often unique for different size networks. In such networks, the switch boards need to be assigned logical board numbers to identify each switch board's position in the network topology. Such identifiers either can be assigned during the installation of the network, or may be determined by allowing the network to discover itself.

While network self discovery has advantages, the regularity of interconnection between stages poses a challenge to efficient discovery, particularly for networks with multiple intermediate stages of switches. An obstacle to network self discovery is the possibility of incorrect network wiring, or incorrect or incomplete network connections during installation.

High performance computing environments demand high reliability, high bandwidth, and low latency. Such requirements may be addressed by constructing multi-stage networks that provide multiple, distinct data paths between every pair of network endpoints, and by constructing the network so that each data path requires the same minimal number of hops. As computing demands continue to grow, networks with larger numbers of endpoints will be needed. One way for a network to support more endpoints while providing the desired bandwidth and latency characteristics is to construct switch networks with more stages of switches.

One existing method for determining the topology of a multistage network, with one intermediate stage of switches, involves a series of guesses based on the number of switch boards found in the network. Each switch board is compared to every switch board position in a theoretical topology to determine where the particular switch board is in the real topology. This method is not practical and sometimes not practicable when multiple intermediate stages are involved. Thus, there exists a need for a way to quickly discover the topology and identify the individual entities in a multi-stage network during self discovery.

SUMMARY OF THE INVENTION

The invention relates generally to the field of network architecture, and more particularly to a system and method for network topology discovery and identification of switches in an N-stage interconnection network.

In one aspect, the invention involves a method of discovering a topology and identifying switches in an N-stage switch network comprising a plurality of interconnected switch boards. The method includes ascertaining an intended topology of the N-stage switch network, creating a list of the plurality of switch boards that are present in the N-stage switch network, and determining a connection pattern for each of the plurality of switch boards by obtaining information indicating how each of the plurality of switch boards is connected to neighboring switch boards. The method further includes classifying each of the plurality of switch boards on the list of the plurality of switch boards as an outer switch board (OB), or an inner switch board (IB), and creating a respective OB list of the switch boards characterized as a OB, and creating a respective IB list of the switch boards characterized as an IB. The method further includes classifying each of the switch boards on the OB list as a stage 1 switch board, stage 2 switch board, or unknown, and classifying each of the switch boards on the IB list as one of a stage 3 switch board to a stage N switch board. The method still further includes grouping the stage 2 switch boards into sectors, grouping the stage 1 switch boards into sectors, and determining a number for each switch board in stages 1 to N, thereby determining the topology of the N-stage switch network.

In one embodiment, determining a number for each stage 1 switch board includes using information about stage 2 to stage 1 connections and a sector ID to assign a number to each stage 1 switch board. In another embodiment, determining a number for each stage 1 switch board includes using information about stage 1 to stage 2 connections and a sector ID to assign a number to each stage 2 switch board. In still another embodiment, determining a number for each stage 3 to stage N switch board includes using information about the numbers assigned to switch boards in a previous stage, and connections between switch boards in the previous stage to switch boards in a next stage to number each stage 3 to stage N switch board.

In other embodiments, creating a list of the plurality of switch boards that are in communication with the N-stage switch network includes reading a plurality of registers on each of the plurality of switch boards. In another embodiment, obtaining information indicating how each switch board is connected to neighboring switch boards includes reading a plurality of registers on each of the plurality of switch boards and retrieving the information indicating how each switch board is connected to neighboring switch boards. In still another embodiment, ascertaining an intended topology of the N-stage switch network includes retrieving from a memory a previously selected topology. In yet another embodiment, the method includes validating the determined topology by comparing the determined topology to the intended topology.

In another aspect, the invention involves a program storage device readable by a machine, tangibly embodying a program of instructions executable by the machine to perform method steps for discovering a topology and identifying switches in an N-stage switch network comprising a plurality of interconnected switch boards. The method steps include ascertaining an intended topology of the N-stage switch network, creating a list of the plurality of switch boards that are present in the N-stage switch network, and determining a connection pattern for each of the plurality of switch boards by obtaining information indicating how each of the plurality of switch boards is connected to neighboring switch boards. The method steps further include classifying each of the plurality of switch boards on the list of the plurality of switch boards as an outer switch board (OB), or an inner switch board (IB), and creating a respective OB list of the switch boards characterized as a OB, and creating a respective IB list of the switch boards characterized as an IB. The method steps further include classifying each of the switch boards on the OB list as a stage 1 switch board, stage 2 switch board, or unknown, and classifying each of the switch boards on the IB list as one of a stage 3 switch board to a stage N switch board. The method steps still further include grouping the stage 2 switch boards into sectors, grouping the stage 1 switch boards into sectors, and determining a number for each switch board in stages 1 to N, thereby determining the topology of the N-stage switch network.

In one embodiment, determining a number for each stage 1 switch board includes using information about stage 2 to stage 1 connections and a sector ID to assign a number to each stage 1 switch board. In another embodiment, determining a number for each stage 1 switch board includes using information about stage 1 to stage 2 connections and a sector ID to assign a number to each stage 2 switch board. In still another embodiment, determining a number for each stage 3 to stage N switch board includes using information about the numbers assigned to switch boards in a previous stage, and connections between switch boards in the previous stage to switch boards in a next stage to number each stage 3 to stage N switch board.

In other embodiments, creating a list of the plurality of switch boards that are in communication with the N-stage switch network includes reading a plurality of registers on each of the plurality of switch boards. In another embodiment, obtaining information indicating how each switch board is connected to neighboring switch boards includes reading a plurality of registers on each of the plurality of switch boards and retrieving the information indicating how each switch board is connected to neighboring switch boards. In still another embodiment, ascertaining an intended topology of the N-stage switch network includes retrieving from a memory a previously selected topology. In yet another embodiment, the method steps include validating the determined topology by comparing the determined topology to the intended topology.

In still another aspect, the invention involves a system for discovering a topology and identifying switches in an N-stage switch network comprising a plurality of interconnected switch boards. The system includes means for ascertaining an intended topology of the N-stage switch network, means for creating a list of the plurality of switch boards that are present in the three-stage switch network, and means for determining a connection pattern for each of the plurality of switch boards by obtaining information indicating how each of the plurality of switch boards is connected to neighboring switch boards. The system farther includes means for classifying each of the plurality of switch boards on the list of the plurality of switch boards as one of an outer switch board (OB), or an inner switch board (IB), and creating a respective OB list of the switch boards characterized as a OB, and creating a respective IB list of the switch boards characterized as an IB, and means for classifying each of the switch boards on the OB list as a stage 1 switch board, stage 2 switch board, or unknown. The method still further includes means for classifying each of the switch boards on the IB list as one of a stage 3 switch board to a stage N switch board, means for grouping the stage 2 switch boards into sectors, and for grouping the stage 1 switch boards into sectors, and means for determining a number for each switch board in stages 1 to N, thereby determining the topology of the N-stage switch network.

In one embodiment, the system further includes means for validating the determined topology by comparing the determined topology to the intended topology. In another embodiment, the means for ascertaining an intended topology of the N-stage switch network includes a graphical user interface configured to receive input from a network installer. In still another embodiment, the system further includes a management server in communication with the N-stage switch network.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 9A-9J are illustrative expanded flow diagrams of the method for network topology discovery for a three-stage switch network of FIG. 8.

FIGS. 13A-13K are illustrative expanded flow diagrams of the method for network topology discovery for an N-stage switch network of FIG. 12.

DESCRIPTION OF THE INVENTION

The invention relates generally to the field of network architecture, and more particularly to a system and method for network topology discovery and identification of switches in an N-stage interconnection network. The method for network topology discovery and identification of switches is first described for a three-stage switch network, and described for an N-stage switch network.

Figure 1:
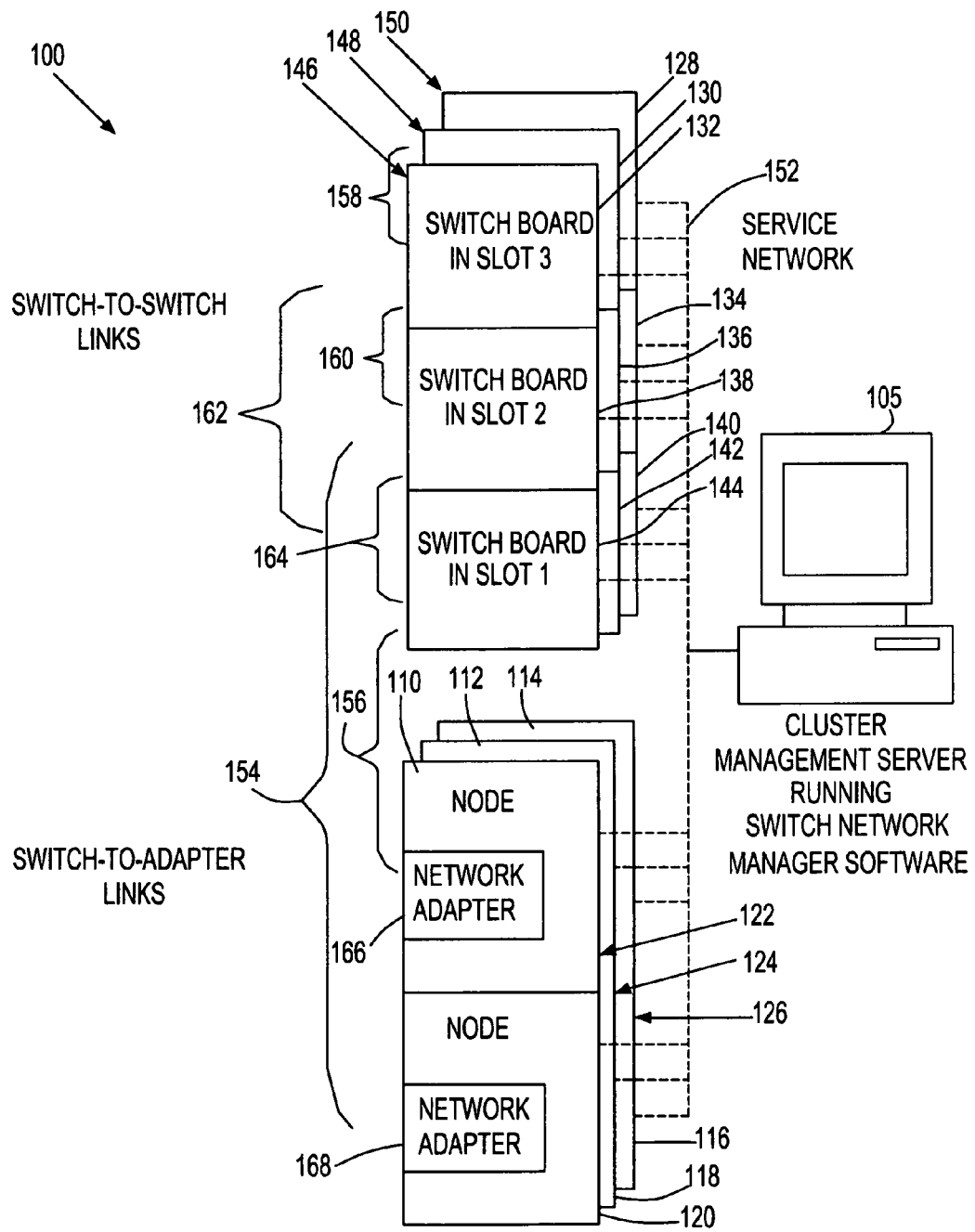
FIG. 1 is an illustrative schematic diagram of a high performance switch (HPS) network employing a method for network topology discovery for a three-stage switch network, according to one embodiment of the invention.

Referring to FIG. 1, in one embodiment, a schematic diagram of a high performance switch (HPS) network 100 employing a system and method for topology discovery and switch identification is shown. The HPS network 100 includes a management server 105, node frames 122, 124, 126, and switch frames 146, 148, and 150. The switch frame 146 includes switch boards 132, 138, and 144. The switch frame 148 includes switch boards 130, 136, and 142. The switch frame 150 includes switch boards 128, 134, and 140. The node frame 122 includes compute nodes 110 and 120. The node frame 124 includes compute nodes 112 and 118. In other embodiments, more or less switch frames and node frames can be included. Compute node 110 includes a network adapter 166 and compute node 120 includes network adapter 168. Compute nodes 112, 114, 118, and 116 each include network adapters, which are not shown.

In one embodiment, Switch Network Manager software ("Network Manager") resides on a mass storage device (e.g., a hard disk) and executes in memory (e.g., Random Access Memory, Read Only Memory, or Cache Memory) on the management server 105. The Switch Network Manager includes all of the functionality that is required to perform all the tasks necessary to determine the topology of the network 100.

In another embodiment, a program storage device readable by a machine, tangibly embodies the Switch Network Manager software (a program of instructions), which is executable by the machine (e.g., the management server 105) to perform method steps for discovering a topology and identifying switches in an N-stage switch network including a plurality of interconnected switch boards. The method steps are described in detail hereinbelow. The program storage device can include a floppy disk, a compact disk (CD), a digital video disk (DVD), magnetic tape, a removable or external hard disk.

Topology discovery and identification necessarily takes place when the network 100 is installed. However, topology discovery and identification is not restricted to take place only at installation time. During network 100 installation, the switch boards (e.g., 132, 138, 144) of the network 100 are placed into the slots of a switch frame 146. Compute nodes (e.g., 110, 120) may also be placed into one or more slots of the node frame 122. Ports of the switch boards and ports of the network adapters 166, 168 in the compute nodes 110, 120 are then cabled together in a specific way, such that switch-to switch links 158, 160, 162, 164 and switch-to adapter links 154, 156 form a particular topology that a network installer has selected as the intended topology for the switch network 100.

The network installer (e.g., a technician) selects the intended topology by using a graphical user interface (GUI) provided by the Network Manager. The GUI includes a pull-down menu of supported topologies. The GUI of the Network Manager stores the network installer's selection so that the selection can later be compared to the discovered physical switch network topology. The intended switch network topology selection provides a starting point for determining whether the installed topology matches the intended topology.

In the HPS network 100, the compute nodes 122, 124, 126 connect to each other over the switch network. In addition, the management server node 105 connects to each switch board 128, 130, 132, 134, 136, 138, 140, 142, 144 and each compute node 110, 112, 114, 116, 118, 120 via a service network 152. The service network 152 would typically be a private Ethernet used exclusively for out-of-band service traffic used to manage the HPS network 100. The Network Manager communicates with components in the switch frames 146, 148, 150 and the node frames 122, 124, 126 over the service network 152. The frame component that communicates with the Network Manager is called the bulk power adapter (BPA) and the compute node component is called the flexible service processor (FSP).

Figure 2A:
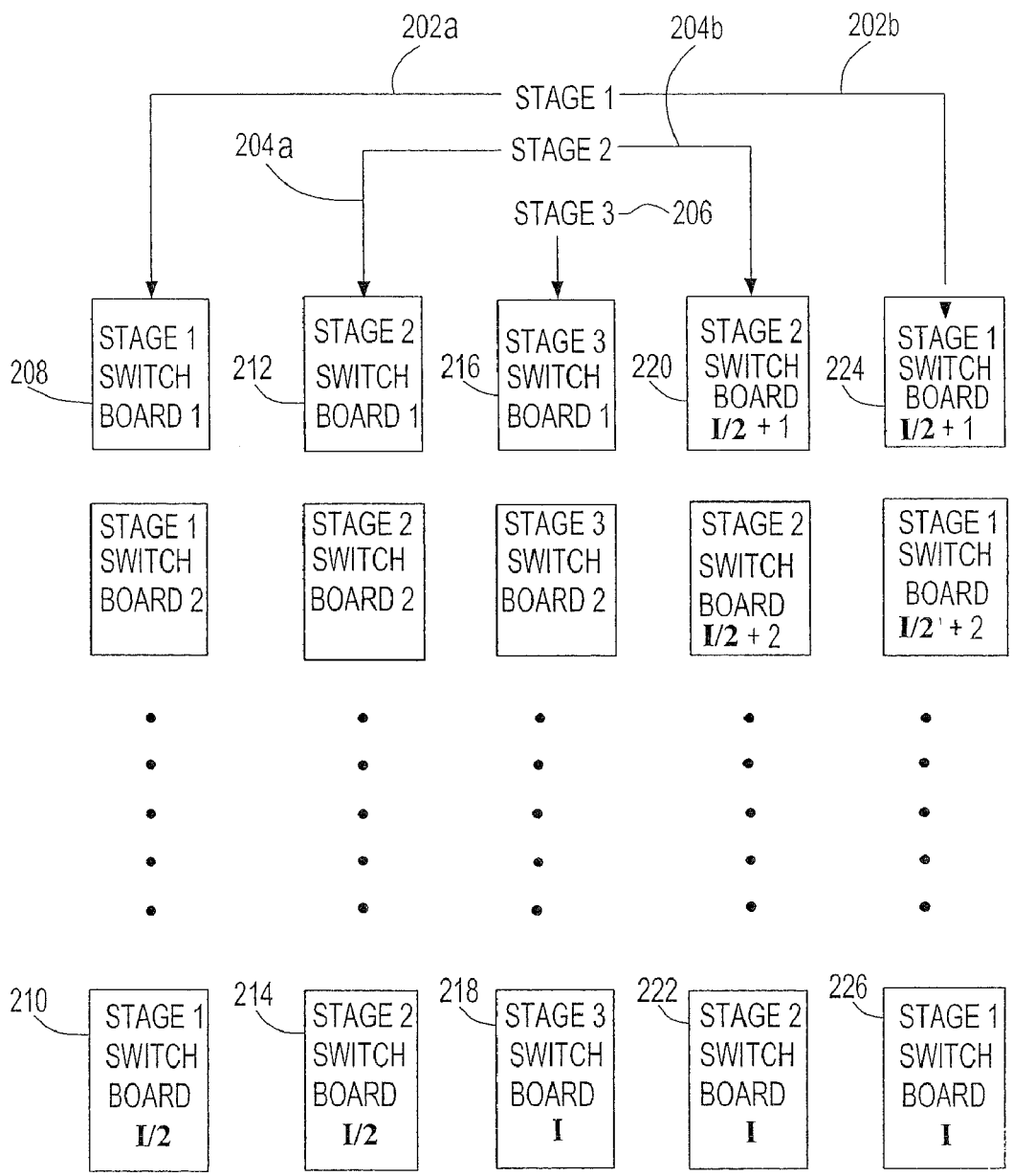
FIG. 2A is an illustrative block diagram of a three-stage switch network, according to one embodiment of the invention.

Referring to FIG. 2A, a block diagram of a three-stage switching network is shown. A first half 202*a* of stage one includes switch board one 208 to switch board I/2 210, where I is the total number of switch boards in stage one. A second half 202*b* of stage one includes switch board (I/2+1) 224 to switch board I 226. A first half 204*a* of stage two includes switch board one 212 to switch board I/2 214, where I is the total number of switch boards in stage two. A second half 204*b* of stage two includes switch board (I/2+1) 220 to switch board I 222. Stage three 206 includes switch board one 216 to switch board I 218, where I is the total number switch boards in stage three. The first half 202*a* of stage one is interconnected to the first half 204*a* of stage two. The second half 202*b* of stage one is interconnected to the second half 204*b* of stage two. The first half 204*a* of stage two and the second half 204*b* of stage two are interconnected to stage three 206

Figure 3:
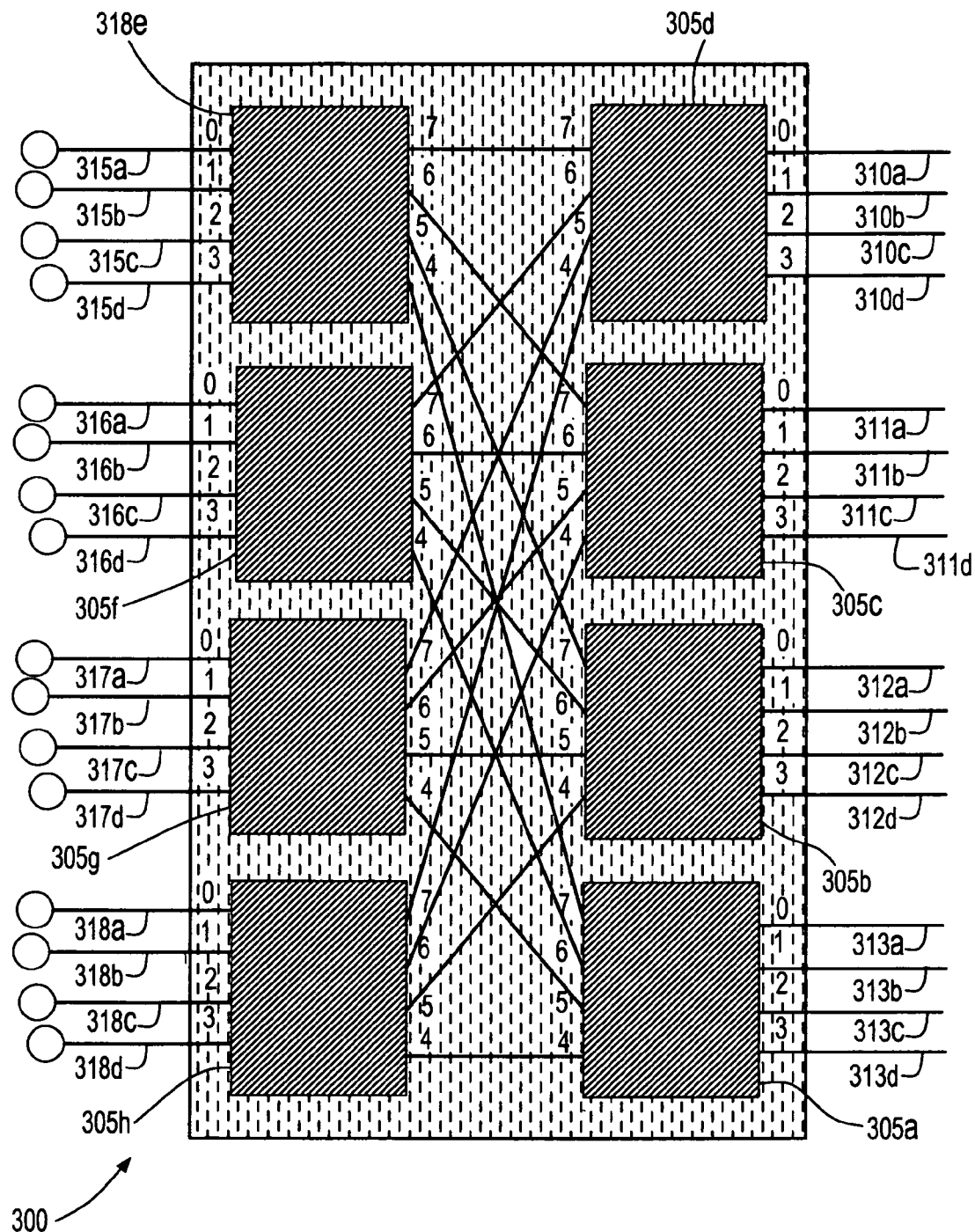
FIG. 3 is an illustrative schematic diagram a single switch board, according to one embodiment of the invention.
Figure 4:
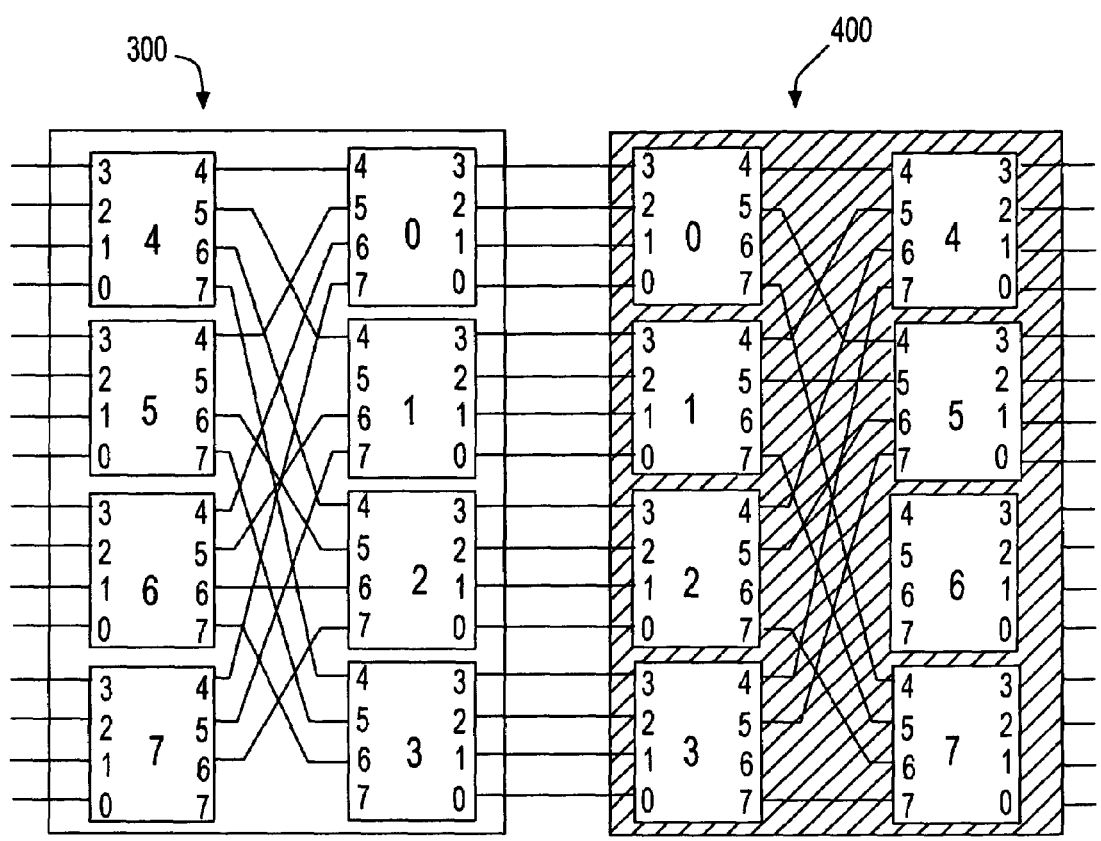
FIG. 4 is an illustrative schematic diagram of two connected switch boards, according to one embodiment of the invention.

Referring to FIG. 3, in one embodiment, a schematic diagram of a switch board 300 in the network 100 is shown. The switch board 300 includes eight (8) switch chips 305*a-h* numbered zero (0) to seven (7) respectively. The eight switch chips 305*a-h* are numbered automatically by the switch board 300 itself. Each switch chip 305*a-h* has four switch chip ports 310*a-d*, 311*a-d*, 312*a-d*, 313*a-d*, 315*a-d*, 316*a-d*, 317*a-d*, 318*a-d*, respectively. The switch chip ports enable each switch chip 305*a-h* to send and receive data when connected to another switch board 400 (FIG. 4). For each switch chip 305*a-h*, the four switch ports are numbered automatically, from zero (0) to seven (7), by the switch board 300 itself.

Figure 5A:
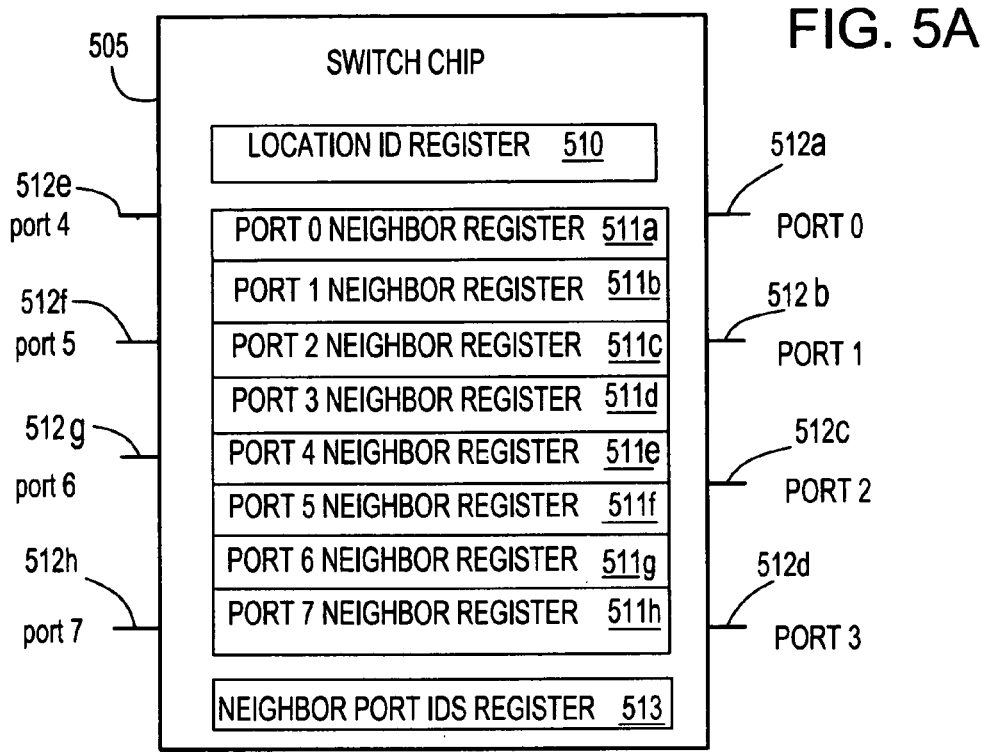
FIG. 5A is an illustrative block diagram of switch chip registers, according to one embodiment of the invention.
Figure 5B:
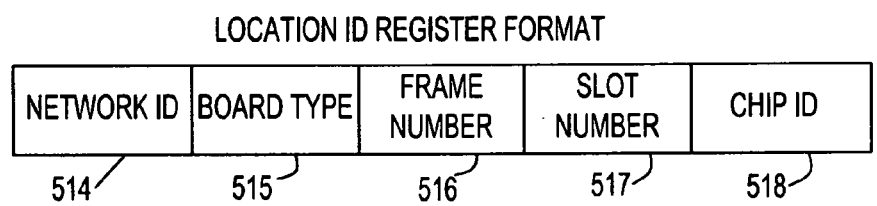
FIG. 5B is an illustrative block diagram of Location ID register format, according to one embodiment of the invention.
Figure 5C:
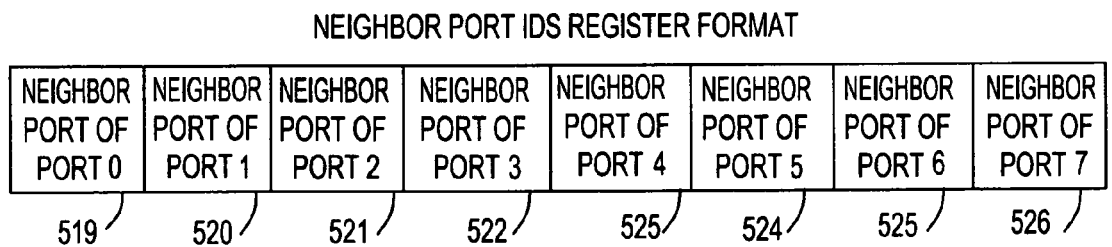
FIG. 5C is an illustrative block diagram of a Neighbor Port ID register format, according to one embodiment of the invention.

Referring to FIGS. 5A-C, in one embodiment, a switch chip 505 (e.g. switch chips 0-7) includes functionality that facilitates network topology discovery. Switch chip 505 includes a 32-bit Location ID register 510 which stores a network ID 514, a board type 514, a frame number 516 and slot ID number 517 of the switch board 300 that the switch chip 505 belongs to, and a switch chip ID number 518 of the particular switch chip 505. The frame and slot IDs are stored in the Location ID register 510 by switch board microcode when power is applied to the frame. The switch chip ID is stored in the Location ID 510 register by the switch chip hardware.

Switch chip 505 also includes eight 32-bit Neighbor ID registers 511a-h (one for each port 512a-h on the switch chip 505). Each of the eight Neighbor ID registers 511a-h stores the frame number and slot number of one of the eight neighboring switch boards that is connected to a port 512a-h on the switch chip 505. Each of the eight Neighbor ID registers for the switch chip 505 also stores the switch chip number of the switch chip on the connected neighboring switch chip board that is connected to the port of the switch chip 505.

Switch chip 505 also includes a 32-bit Neighbor Port ID register 513. The Neighbor Port ID register stores the port numbers 519-526 of switch chips connected to the eight ports 512a-h of the switch chip 505.

The frame number 516 and the slot number 518 indicate in which frame and slot in the network that a particular switch board resides. Each connection in the network is uniquely identified by the frame number 516, slot number 517, switch chip number 518, and port number.

When a link between any two switch chip ports becomes active, the contents of the Location ID registers on the two switch chips passes across the link and is stored into the Neighbor ID register for the appropriate port, and the Port ID of the other side of the link passes across and is stored into the appropriate section of the Port ID register (the Port ID of the $i^{th}$ port's neighbor is stored in the $i^{th}$ four bits of the Port IDs register). Hence, a neighbor of any link in the network is discovered by inspecting the Neighbor ID and the appropriate section of the Port IDs register for that link. This property allows a software Network Manager to determine the physical connectivity of every active link in the network.

Figure 6:
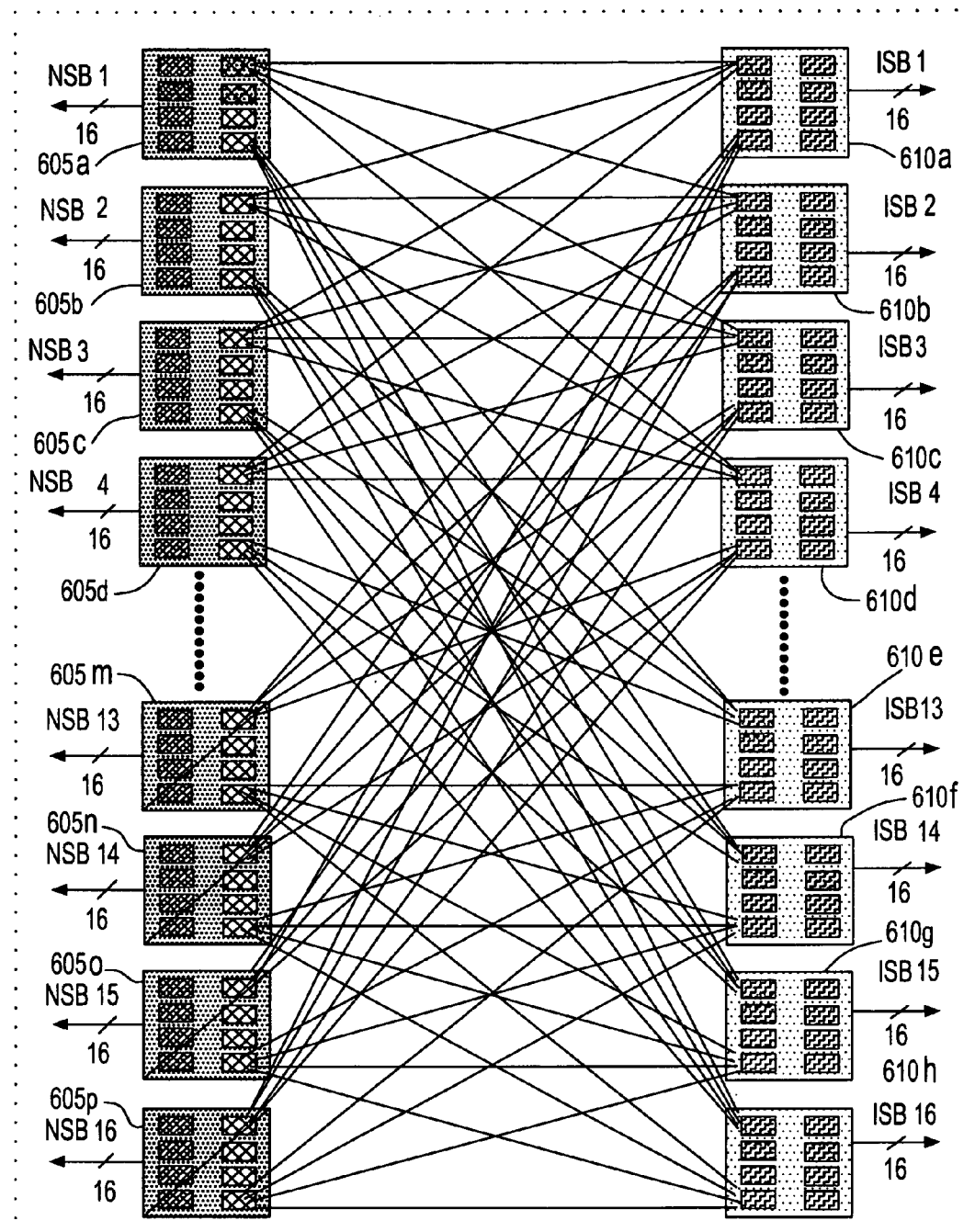
FIG. 6 is an illustrative schematic diagram of a 256-endpoint sector (16 switch boards of FIG. 2), according to one embodiment of the invention.

Referring to FIG. 6, in one embodiment, 256-endpoint sector 600 is shown. A three-stage network is constructed of 256-endpoint sectors that form two of the stages. The two stages are connected by a set of switch boards that make up the third stage. The position of a particular switch board in the network determines the switch board's function in the network topology. Each 256-endpoint sector includes 16 Node Switch Boards (NSBs) 605a-p and 16 Intermediate Switch Boards (ISBs) 610a-p.

Ports 0-3 (e.g., 315a-d, 316a-d, 317a-d, 318a-d of FIG. 3) of switch chips 4-7 (e.g., 305e-h of FIG. 3) of a switch board functioning as an NSB connect to network interface cards (e.g. network adapter 166 of FIG. 1) of a compute node (e.g. compute node 110 of FIG. 1). Ports 0-3 (e.g., 315a-d, 316a-d, 317a-d, 315a-d of FIG. 3) of the switch chips 4-7 (e.g., 305e-h of FIG. 3) are referred to as "node ports". Ports 0-3 (e.g. 310a-d, 311a-d, 312a-d, 313a-d of FIG. 3) of switch chips 0-3 (e.g., 305a-d of FIG. 3) are referred to as "external ports".

The 16 NSBs 605a-p in each sector each have 16 node ports, and hence allow for 256 network interface card endpoints to attach. The switch boards 300 in the third stage, which connect all sectors, function as Jump Switch Boards (JSBs).

Figure 7:
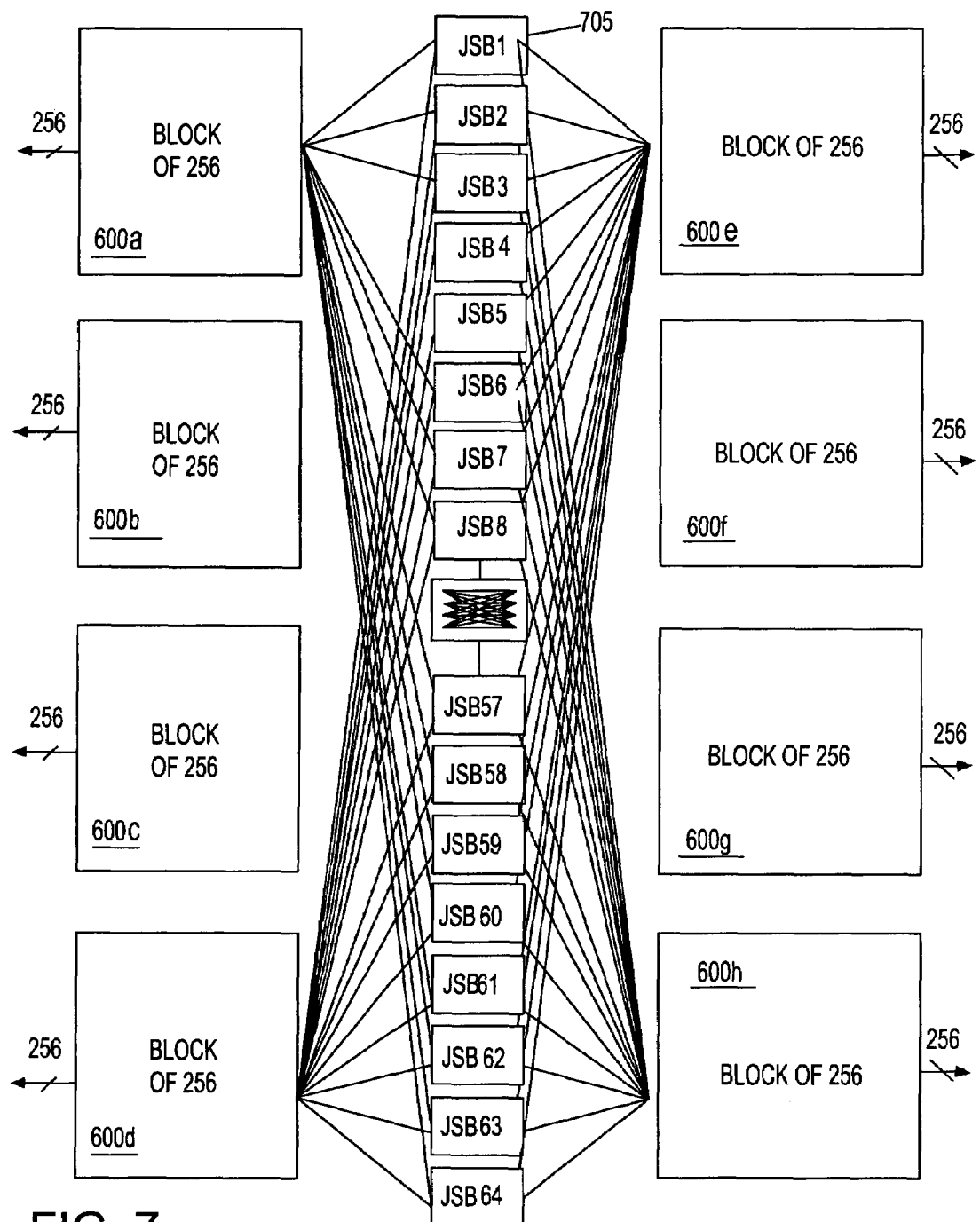
FIG. 7 is an illustrative schematic diagram of a 2048-endpoint three stage topology constructed from eight 256-endpoint sectors, according to one embodiment of the invention.

Referring to FIG. 7, in one embodiment, a 2048-endpoint three-stage topology 700 including eight 256-endpoint sectors 600a-h connected by 64 JSBs (generally 705) is shown. The ISBs and JSBs are sometimes referred to as "interior boards".

As previously described, the Network Manager resides and executes on the management server. When started, the Network Manager communicates over the service network 152 to gather the physical connectivity information for every active link in the network 100, and builds a data structure called the Device Database (stored on the management server 105), which stores the physical connection data for the HPS network 100.

The Network Manager supports a set of queries against the Device Database, such as "what is the list of switches in the network?" and "what is the neighbor location ID and port connected to switch chip C port P in frame F slot S?" The topology discovery component of the Network Manager uses such queries to build the data structures it uses to assign switch board numbers and verify the discovered topology against the intended topology.

Described below is an implementation of a methodology for topology discovery, identification and verification of a 2048-endpoint, three-stage network in which 256-endpoint sectors are connected through JSBs. The methodology can be extended to apply to a network with more than three stages, by constructing a network that has multiple stages of internal boards, with 256-endpoint sectors forming the first two stages. In the three-stage implementation, switch numbers are assigned as follows: JSBs receive the lowest switch numbers, ISBs receive the second-lowest switch numbers, and NSBs receive the highest switch numbers. For example, the 2048-endpoint three-stage network previously described includes 320 switch boards, with the JSBs numbered 1-64, the ISBs number 65-192, and the NSBs numbered 193-320. Other topologies using JSBs to connect 256-endpoint sectors would number the switch boards accordingly.

Figure 8:
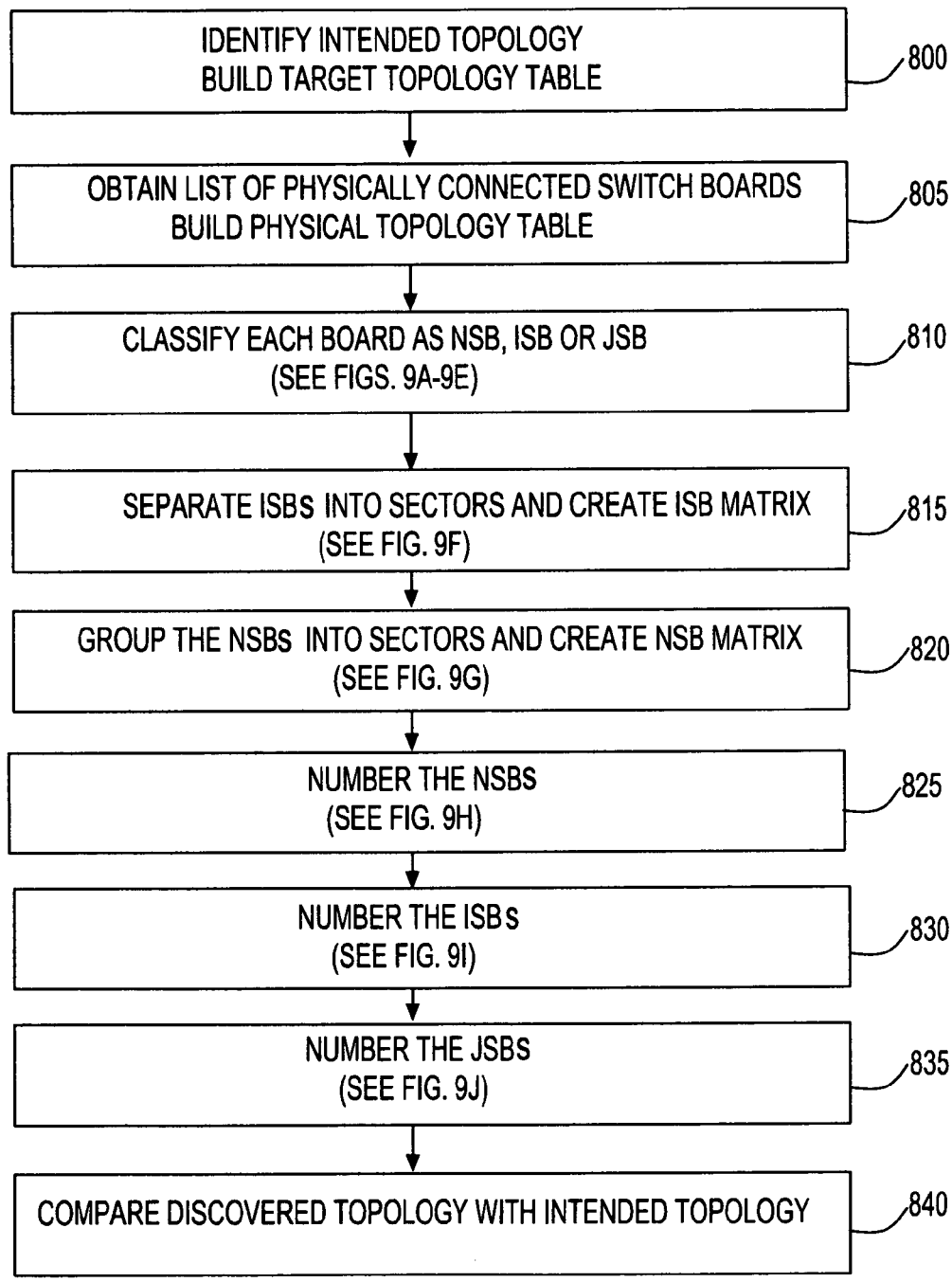
FIG. 8 is an illustrative flow diagram of an outline of a method for network topology discovery for a three-stage switch network, according to one embodiment of the invention.

Referring to FIG. 8, in one embodiment, a flow diagram describing an outline of the method for network topology discovery for a three-stage switch network is shown. Certain steps of the disclosed method will be described in further detail and shown in FIGS. 9A-9J.

The Network Manager (executing on the management server 105 shown in FIG. 1) identifies the intended topology that was stored on the management server 105 via the GUI (by the network installer) during network installation, builds a data structure (Target Topology Table) that includes connection information for the intended topology, and stores the Target Topology Table on the management server 105 (Step 800).

The Target Topology Table is an array [1 . . . largest_switch_number], in which the connection data for switch number i is found in the $i^{th}$ entry. Each entry in the Target Topology as the following format:

--- chip_entry, an array [0..7] of type port_neighbor
type port_neighbor is an array [0..3] of
   integer neighbor_switch_number
   integer neighbor_chip_id
   integer neighbor_port_id.

---

The Target Topology Table defines, for any given switch chip, the switch number, switch chip ID and port ID for the expected neighbor of each external port on the switch board.

The Network Manager queries a Device Database (stored on the management server 105) to obtain a list of physically connected switch boards (i.e., physically present in the network 100), and issues queries to get the connection information for each link in the network 100. The Network Manager then uses this information to build a data structure referred to as a Physical Topology Table. The information is stored in the Physical Topology Table is stored in a format that can be easily used to compare the discovered topology to the intended topology (Step 805).

The Physical Topology Table is an array [1 . . . number_of_switches] of type PhysicalEntry, described below.

A PhysicalEntry data type has the following fields.

--- integer switch_number (the switch number eventually assigned to this board)
integer frame_id (the frame in which this board resides)
integer slot_id (the slot in which this board resides)
chip_actual, an array [0..7] of type port_actual (neighbor IDs of ports 0-3 on 8 chips)
type port_actual is an array [0..3] of
    location_id neighbor_chip
    integer neighbor_port_id
type location_id contains
    integer frame_id
    integer slot_id
    integer chip_id

---

Hence, the Physical Topology Table includes, for each external port on each physical switch board, the information (switch board frame and slot, chip and port) that identifies the neighboring port. The switch number field in each entry is empty initially and is filled in by the topology discovery algorithm.

The Network Manager next classifies each switch board in the network 100 as an NSB (e.g., 605a-p in FIG. 6), ISB (e.g., 610a-p in FIG. 6), or JSB (e.g., 705 in FIG. 7) (Step 810). The Network Manager then separates the ISBs into sectors and creates an ISB matrix (Step 815). The Network Manager next uses the ISBs in each sector to group the NSBs into sectors and create an NSB matrix (Step 820). The Network Manager then uses the properties of ISB to NSB connections along with a sector ID to number the NSBs (Step 825). The Network Manager then uses the properties of NSB to ISB connections along with the sector ID to number the ISBs (Step 830). The Network Manager next uses the properties of ISB to JSB connections to number the JSBs (Step 835). Finally, the Network Manager compares the discovered topology with the intended topology (Step 840). The Network Manager steps through the Physical Topology Table, and for each entry, uses the entry's switch number to find the corresponding entry in the Target Topology Table. The Network Manager compares the neighbor information in the Target Topology Table entry with the neighbor information in the Physical Topology Table. If the neighbor switch numbers, switch chip IDs or port IDs differ, the Network Manager marks the physical link entry in the Device Database as incorrectly wired.

Classify Each Switch Board as NSB, ISB, or JSB

Referring to FIG. 8 and FIGS. 9A to 9E, in one embodiment, a flow diagram of Step 810 expanded into sub-steps is shown. As previously described, Step 810 involves the Network Manager classifying each switch board in the network 100 as an NSB, ISB, or JSB. Step 810 includes the sub-steps described below.

Categorize all Boards in the Switch Board List as NI (NSB or ISB) or IJ (ISB or JSB)

Figure 9A:
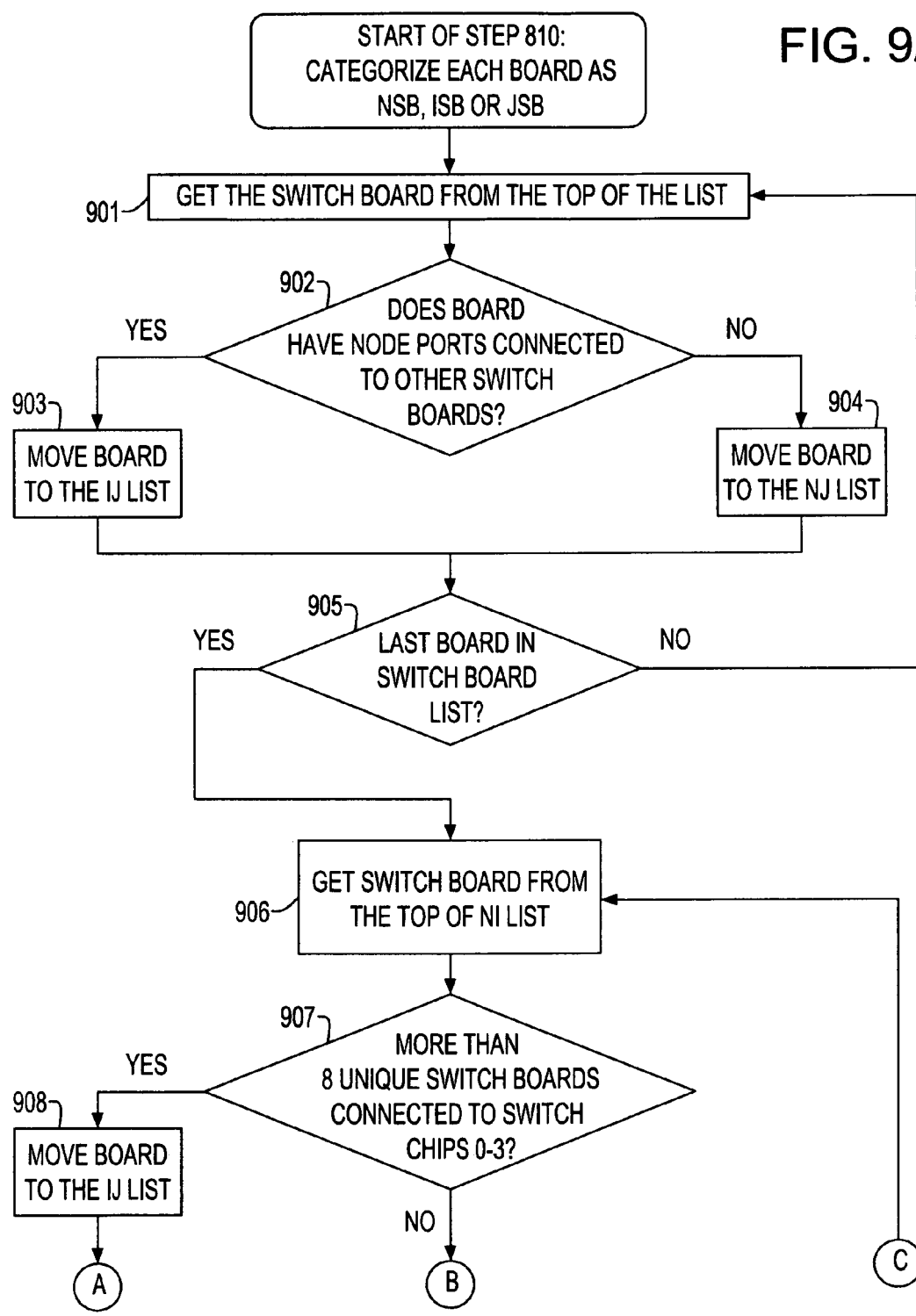

Referring to FIG. 9A, the following steps (Steps 901-905) take advantage of the fact that interior switch boards (ISBs and JSBs) are the only switch boards that have node ports connected to other switch boards.

The Network Manager retrieves a switch board from the top of the switch board list (Step 901). The Network Manager then examines physical connection information for the node ports of the board at the top of the switch board list to determines if the switch board has node ports connected to other switch boards (Step 902). If the switch board has more than one node port connected to other switch boards, the switch board is moved to an IJ list (switch boards that function as either an ISB or a JSB) (Step 903). If the switch board does not have nodes connected to other switch boards, the switch board is moved to an NI list (switch boards the function as either an NSB or an ISB) (Step 904). The Network Manager checks to see if the switch board is the last one in the switch board list (Step 905). If it is not, the Network Manager returns to Step 901. Steps 901 to 905 are repeated until all the switch boards on the switch board list are moved to either the IJ list or the NI list.

Categorize Switch Boards in the NI List as NSB, ISB, or Unknown

Figure 9B:
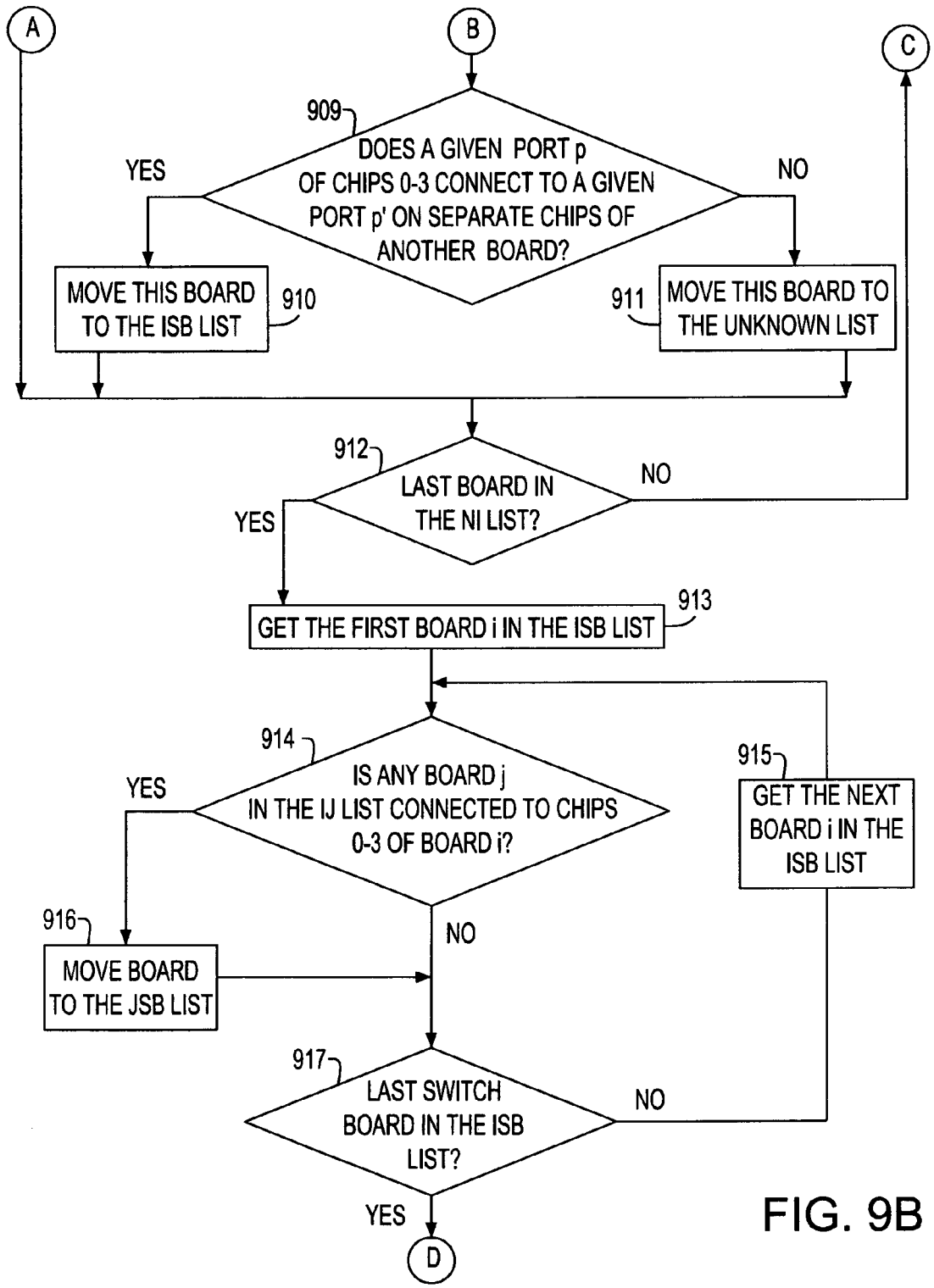

Referring to FIGS. 9A and 9B, the following steps (Steps 906-912) take advantage of properties of NSB to ISB and ISB to JSB connections. One property is that an NSB connects to 16 different ISBs via distinct connections defined by switch chips 0-3 in combination with switch chip ports 0-3. A second property is that an ISB connects to a given switch chip port on separate switch chips of the same JSB board through the JSB's like-numbered switch chip ports on switch chips 0-3. For example, on one ISB all switch chip ports 0 of switch chips 0-3 might connect to switch chip port 2 of switch chips 0-3, respectively, of a given JSB. On another ISB, all switch chip ports 0 of switch chips 0-3 might connect to switch chip port 1 of switch chips 4-7, respectively, of a given JSB. For example, on one ISB all ports 0 of chips 0-3 might connect to port 2 of chips 0-3, respectively, of a given JSB. On another ISB, all ports 0 of chips 0-3 might connect to port 1 of chips 4-7, respectively, of a given JSB.

If the switch board is the last switch board in the switch board list, the Network Manager retrieves a switch board from the top of the NI list (Step 906). The Network Manager examines the connections of the switch board at the top of the NI list to determine if it has connections to more than eight different switch boards via switch chips 0-3 (Step 907). If the switch board does have connections to more than eight different switch boards, the Network Manager moves the switch board from the NI list to an NSB list (Step 908).

If the switch board does not have connections to more than eight different switch boards, the Network Manager then determines if the switch board connects to a given switch chip port of separate switch chips on the same switch board through its like-numbered switch chip ports on switch chips 0-3 (Step 909). If so, the Network Manager moves the switch board from NI list to an ISB list (Step 910). If the switch board does not meet the criteria or step 907 or step 909, the Network Manager moves the switch board to an "unknown board type" list (Step 911). The Network Manager checks to see if the switch board is the last one on the NI list (Step 912). If it is not, the Network Manager returns to Step 906. Steps 906 to 912 are repeated until all the switch boards on the NI list are moved to either the ISB list or the Unknown Board type list.

Attempt to Classify Boards in the IJ List as JSBs

Still referring to FIG. 9B, the following steps (Steps 913-917) take advantage of the fact that ISB switch chips 0-3 should connect to JSBs, and that some boards have already been classified as ISBs.

If the switch board is the last switch board in the NI list, the Network Manager retrieves a first switch board i from the ISB list (Step 913). The Network Manager then determines if any switch board j on the IJ list connects to switch chips 0-3 of switch board i (Step 914). If a switch board j meets the criteria of step 914, the Network Manager moves the switch board j from the IJ list to the JSB list (Step 916). The Network Manager then checks to see if the switch board is the last one in the ISB list (Step 917). If it is not, the Network Manager gets the next switch board i on the ISB list (Step 915).

Identify as Many Boards as Possible in the IJ List as JSBs or ISBs

Figure 9C:
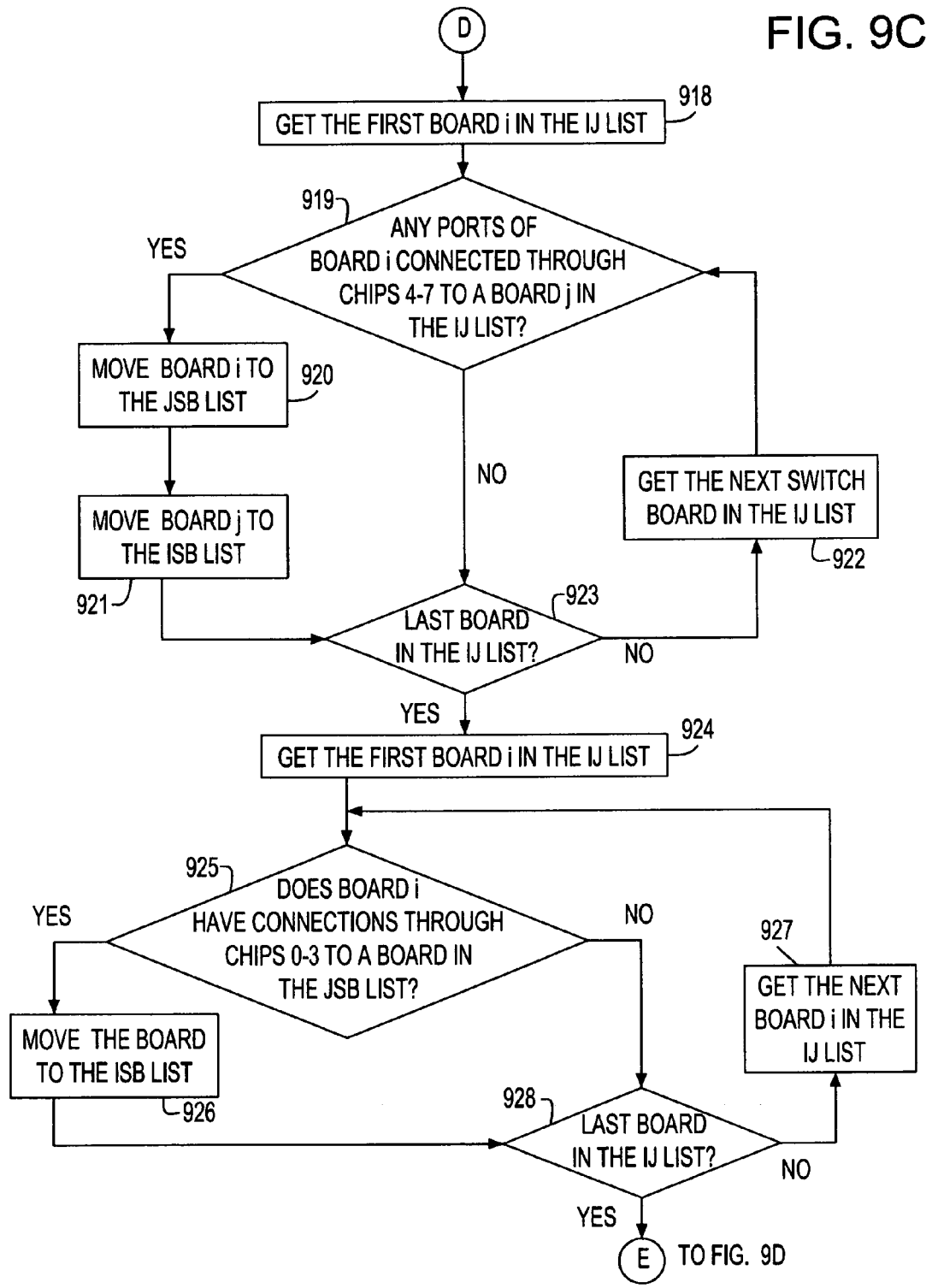

Referring to FIG. 9C, the following steps (Steps 918-923) differentiate JSBs and ISBs in the IJ list by using the fact that switch chips 4-7 of a JSB should connect to an ISB, and that switch boards connected to ISBs via switch chips 4-7 are not in the IJ list (because they are NSBs).

The Network Manager retrieves a first switch board i from the IJ list (Step 918). The Network Manager steps through the IJ list and examines the connections of the switch ports of the switch board i through switch chips 4-7 to all switch boards j in the IJ list (Step 919). If the switch board i has connections through switch chips 4-7 to any switch board j in the IJ list, the Network Manager moves the first switch board i from the IJ list to the JSB list (Step 920), and moves the second switch board j from the IJ list to the ISB list (Step 921). The Network Manager then checks to see if switch board i is the last switch board in the IJ list (Step 923). If it is not, the Network Manager gets the next switch board i on the IJ list (Step 922).

Attempt to Classify the Remaining Boards in the IJ List as ISBs

Still referring to FIG. 9C, the following steps (Steps 924 to 928) take advantage of the fact that ISB switch chips 0-3 should connect to JSBs, and that all, or most, of the JSBs have already been classified and put into the JSB list.

The Network Manager again retrieves a first switch board i from the IJ list (Step 924). Then the Network Manager steps through the IJ list and examines the connections of switch chips 0-3 to determine if switch board i has connection though switch chips 0-3 to a board in the JSB list (Step 925). If the switch board has connections through the switch chips 0-3 to a switch board in the JSB list, the Network Manager moves switch board from the IJ list to the ISB list (Step 926). The Network Manager then checks to see if the switch board is the last switch board in the IJ list (Step 928). If it is not, the Network Manager gets the next switch board i on the IJ list (Step 927).

If the IJ List is Non-Empty, Repeat Steps 918 to 928 One Time

Figure 9D:
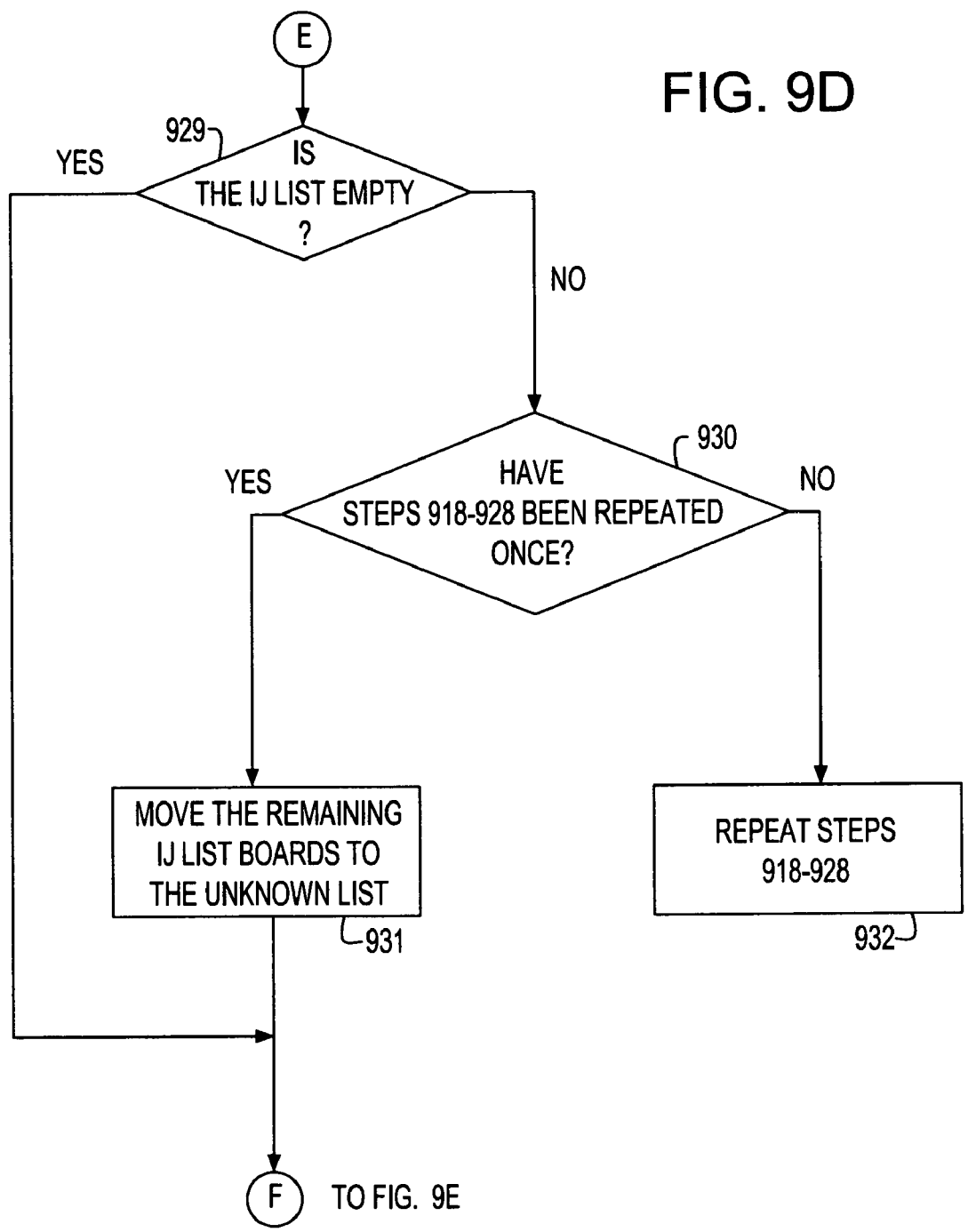

Referring to FIGS. 9C and 9D, the Network Manager reads the IJ list to determine if it is empty (Step 929). If the IJ list is not empty, the Network Manager determines if steps 918 to 928 have been repeated one time (Step 930). If steps 918 to 928 have not been repeated once, the network manage repeats steps 918 to 928 (Step 932). If any switch boards remain in the IJ list after one repetition of steps 918 to 928, the Network Manager moves those switch boards from the IJ list to the unknown list (Step 931).

Figure 9E:
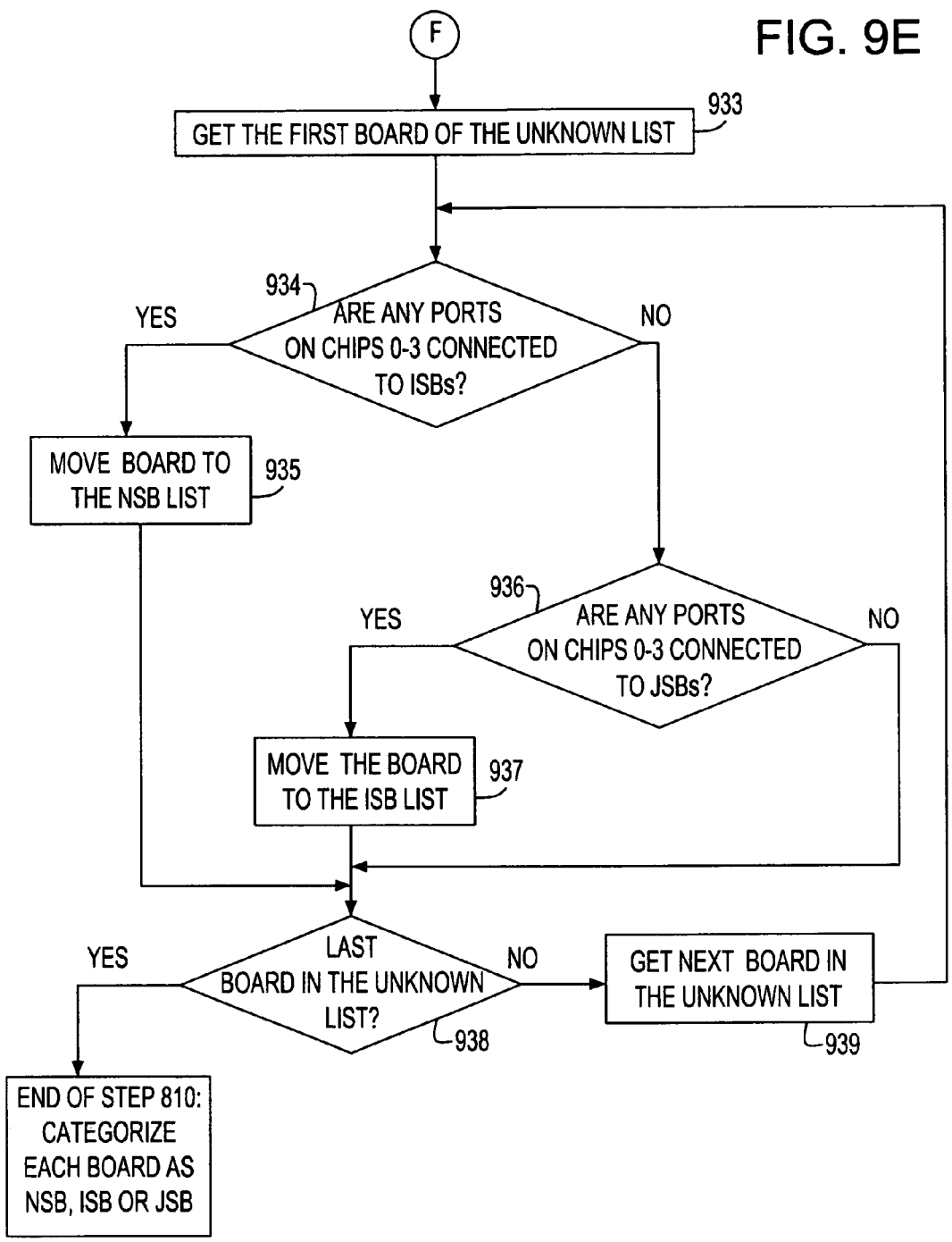

If the Unknown List is Non-Empty, Attempt to Classify the Switch Boards in the Unknown List as Either NSB or ISB Referring to FIG. 9E, the following steps (Steps 933 to 939) take advantage of the fact that NSBs connect to ISBs via switch chips 0-3 of the NSB, and ISBs connect to JSBs via chips 0-3 of the ISB. If any switch boards in the unknown list have switch chip 0-3 connections to boards that have already been classified as ISB or JSB, then they can be classified as NSB or ISB, respectively.

The Network Manager retrieves the first switch board from the unknown list (Step 933). The Network Manager then examines the connections of each switch board in the unknown list to determine if the switch board has any connections through switch chips 0-3 to a switch board in the ISB list (Step 934). If the switch board does have such connections, the Network Manager moves the switch board from the unknown list to the NSB list (Step 935). If not, the Network Manager then examines the connections of that switch board to determine if the switch board has any connections through switch chips 0-3 to a switch board in the JSB list (Step 936). If so, the Network Manager moves the switch board from the unknown list to the ISB list (Step 937). If not, the switch board is not used as part of the network 100. Topology recognition proceeds as if this or any other unclassified switch boards are not present, and errors are logged to call out the unclassified switch boards. The Network Manager then checks to see if there is another switch board on the unknown list (Step 938). If there is, the Network Manager retrieves this switch board and returns to step 934 (Step 939). If there is not, the Network Manager proceeds to step 815.

Group ISBs into Sectors and Create ISB Matrix

Figure 9F:
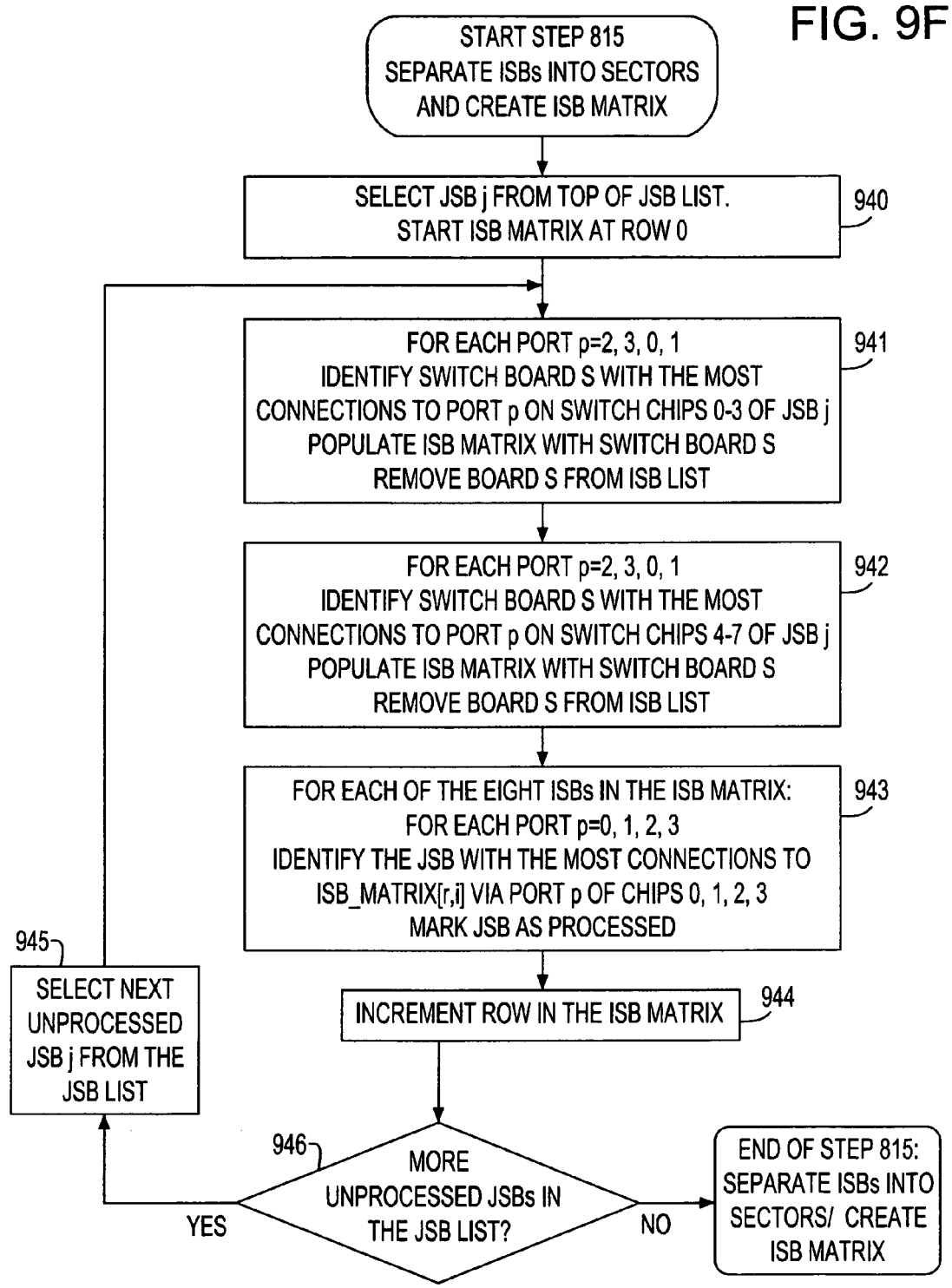
Figure 10:
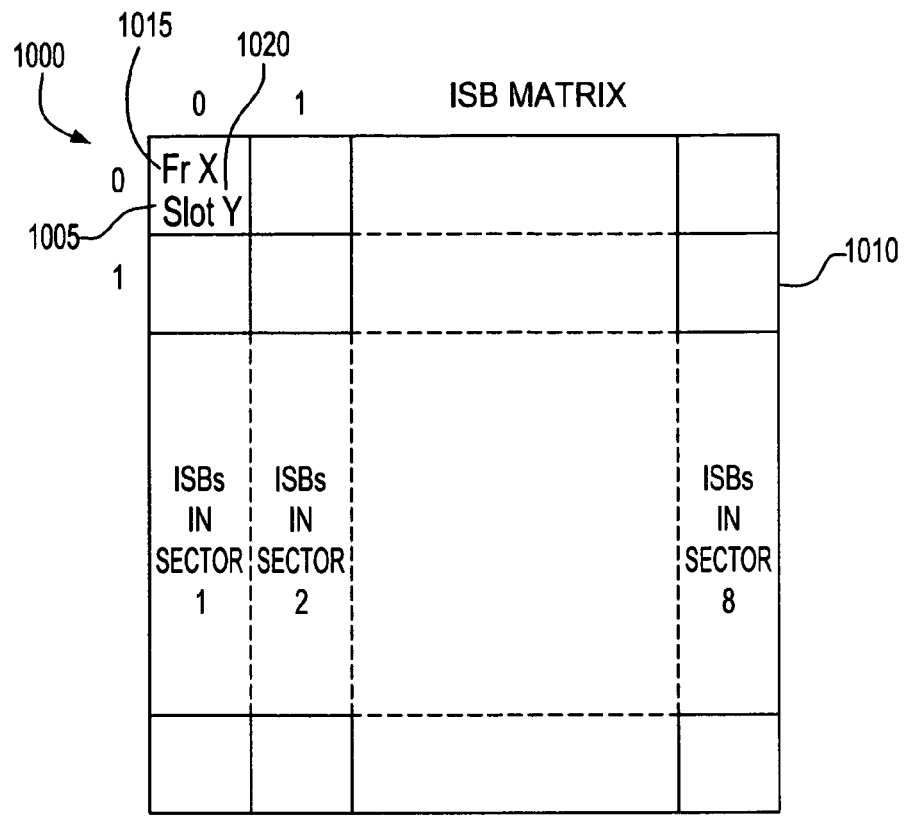
FIG. 10 is an illustrative example of an ISB matrix, according to one embodiment of the invention.

Referring to FIGS. 8, 9F, and 10, in one embodiment, a flow diagram of Step 815 expanded into sub-steps is shown. As previously described, Step 815 involves the Network Manager separating the ISBs into sectors and create an ISB matrix 1000. Step 815 includes the sub-steps described below.

The ISB Matrix 1000 (FIG. 10) is a data structure that is stored on the management server 105 and is used to group the ISBs into sectors. The ISB matrix 1000 includes eight columns. Each column corresponds to a sector and contains the sixteen ISBs in that sector. The ISB matrix 1000 includes sixteen rows where each row contains an ISB in the sector corresponding to the particular column. Each entry in the ISB matrix 1000 identifies one switch by the switch board's switch frame 1015 and slot ID 1020.

The following steps (Steps 940 to 946) take advantage of the fact that any JSB connects to an ISB in each of the eight sectors. For all JSBs, the switch board connected to switch chips 0-3, port two should be an ISB in sector one, the switch board connected to switch chips 0-3 port three should be an ISB in sector two, and so on. The same connection pattern applies to switch chips 4-7. The combination of switch chips 0-3 with ports 0-3 and switch chips 4-7 with ports 0-3 thus identifies eight switch boards, one per sector.

The following steps also take advantage of the fact that each ISB connects to four JSBs. For all ISBs, switch chips 0-3, port zero connect to one JSB, switch chips 0-3 port one connect to a different JSB, and chips 0-3 ports two and three connect to two more JSBs. The ISB matrix is populated with sixteen rows and eight columns in which the ISBs of sector S are found in column S.

The Network Manager picks the JSB j at the top of the JSB list and starts at row zero (set row counter to zero) of the ISB matrix 1000 (FIG. 10) (Step 940). The Network Manager uses the four connection patterns of the switch chips 0-3, ports 0-3 to identify four ISBs, populates the first four entries of row zero 1005 of the ISB matrix 1000, and removes the ISBs from the ISB list (Step 941). The Network Manager then uses the four connection patterns of the switch chips 4-7, ports 0-3 to identify four more ISBs, adds them to row zero 1005 of the ISB matrix 1000, and removes the ISBs from the ISB list (Step 942). The order of the ISBs in the ISB matrix 100 is determined by the switch chip, port combination of the JSB (this orders the ISBs by sector within the row).

The Network Manager then uses the eight ISBs in the ISB matrix 1000 to identify four more JSBs via the four connections patterns mentioned above (switch chips 0-3, ports 0-3), and marks the JSB list entries for the four identified JSBs as processed to remove them from further consideration (Step 943). The Network Manager then increments the row counter (Step 944).

The Network Manager next checks the JSB list for the next unprocessed JSB (Step 946). If there is an unprocessed JSB in the JSB list, the Network Manager repeats steps 941 to 946 and populates the second row 1010 of the ISB matrix 1000 (Step 945). If there is not, the Network Manager proceeds to step 820. When the JSB list has been completely processed, the first row 1050 of the ISB matrix will contain the sector one ISBs, the second row 1010 will contain the sector two ISBs, and so on.

Group NSBs into Sectors and Create NSB Matrix

Figure 9G:
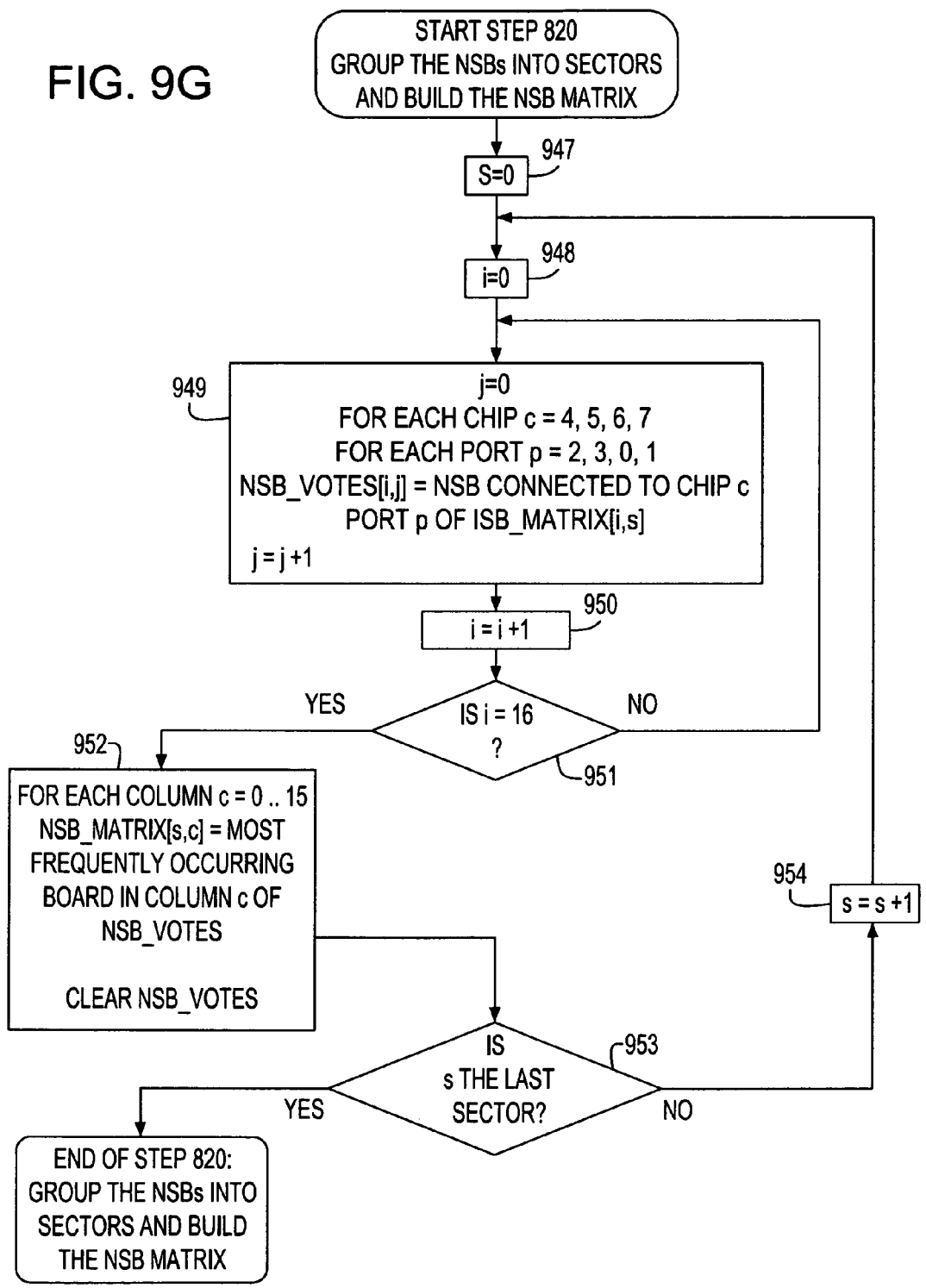

Referring to FIG. 8, and FIG. 9G, in one embodiment, a flow diagram of Step 820 expanded into sub-steps is shown. As previously described, Step 820 involves the Network Manager grouping the NSBs according to sector and building an NSB matrix 1100. Step 820 includes the sub-steps described below.

Figure 11:
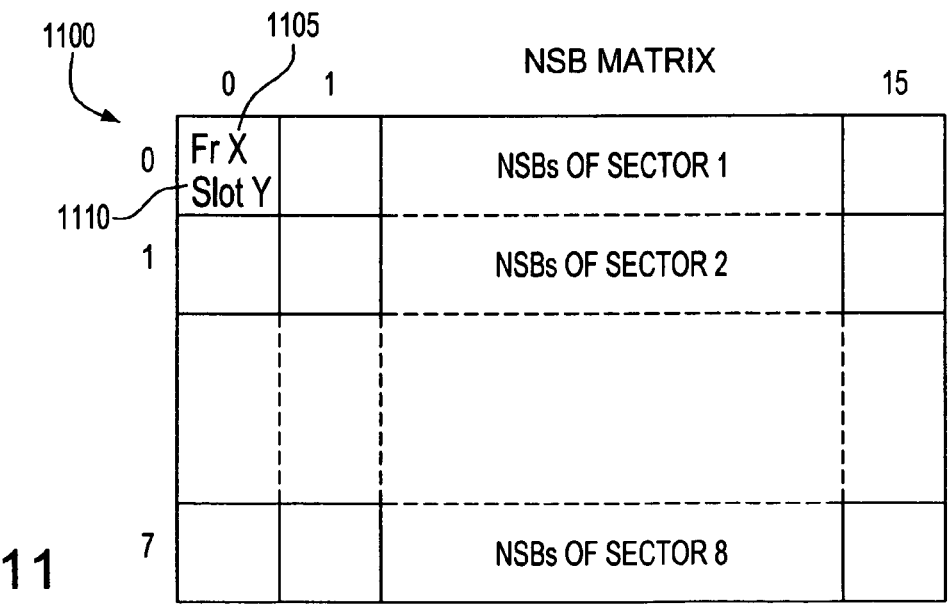
FIG. 11 is an illustrative example of an NSB matrix, according to one embodiment of the invention.

The NSB Matrix 1100 (FIG. 11) is a data structure that is stored on the management server 105 and is used to group the NSBs into sectors. The NSB matrix 1100 includes eight rows. Each row corresponds to a sector and contains the sixteen NSBs in that sector. The NSB matrix 1100 includes sixteen columns where each column contains an NSB in the sector corresponding to the particular column. Each entry in the NSB matrix 1100 identifies one switch by the switch board's switch frame 1105 and slot ID 1110.

The following steps (Steps 947 to 954) take advantage of the ISB to NSB connections to identify the NSBs belonging to a particular sector and order the identified NSBs within the particular sector. For an ISB, each external port of switch chips 4-7 connects to an NSB that occupies a specific position within the sector. For example, switch chip four, port two connects to the first NSB of the sector, switch chip four, port three connects to the second NSB, switch chip six, port zero connects to the eleventh NSB, and so on. All sixteen ISBs of the sector should connect to the first NSB through switch chip four, port two, all sixteen ISBs should connect to the second NSB through switch chip four, port three, and so on.

The Network Manager first sets the sector S to be zero (Step 947), and then sets the index i to zero (Step 948). The Network Manager uses the ISBs in each column of the ISB matrix 1000 to identify the NSBs of each sector. The Network Manager, for each ISB i in the sector, puts a "vote" for each NSB j (the board connected to it via the appropriate (chip, port) combination) into a matrix NSB_votes[i,j] (Step 949). The Network Manager repeats step 949 (increments j) for all the NSBs connected to first ISB. The Network Manager then increments i and moves the next ISB (Step 950). The Network Manager then checks to see if i has reached sixteen (the total number of ISB for sector S) (Step 951). If i has reached sixteen, the NSB_votes matrix is filled. If i is not sixteen, the Network Manager repeats step 949.

Once the NSB_votes matrix for the sector S is filled, the Network Manager selects the most frequently occurring NSB in each column of the NSB_votes matrix as the most likely candidate for the $j^{th}$ NSB of the sector (Step 952). Thus, the NSB to which the majority of the ISBs connect in the expected way is given the relative NSB number within the sector. The Network Manager then checks to see if S is the last sector (Step 953). If S is not the last sector, the Network Manager increments S to the next sector and returns to step 948 (Step 954). As each set of sixteen NSBs is identified, the Network Manager puts them into an NSB matrix 1100 of eight rows and sixteen columns, where the $i^{th}$ row contains the 16 NSBs of sector i.

Number the NSBs

Figure 9H:
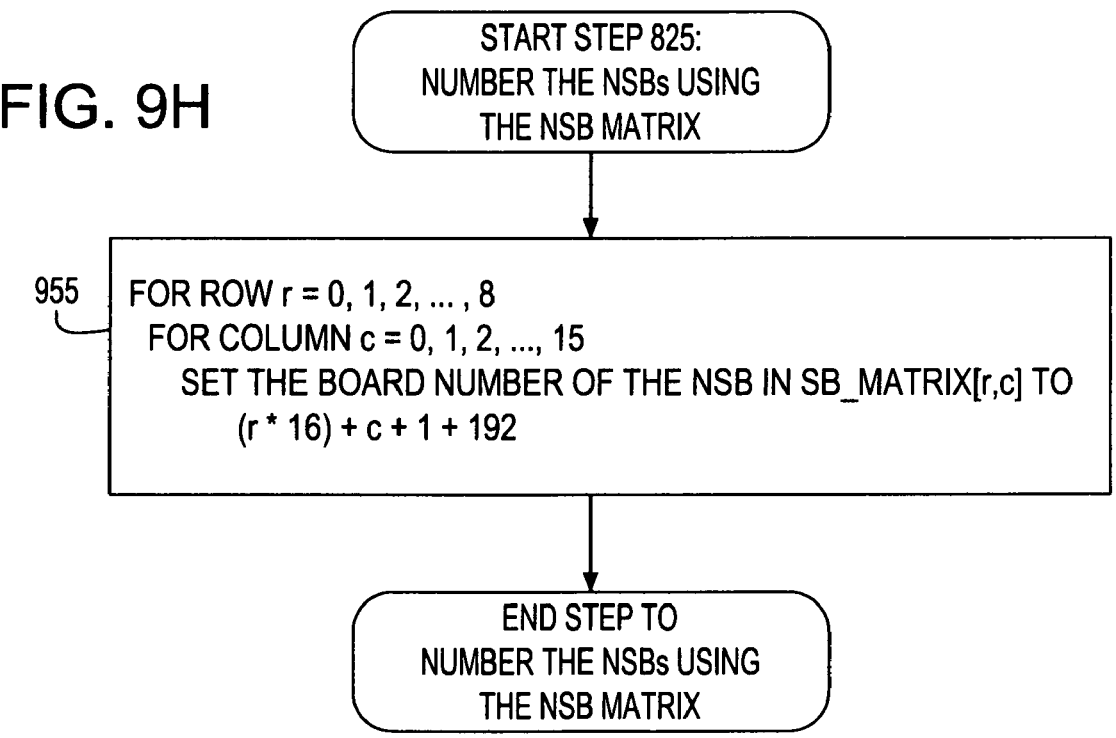

Referring to FIG. 8 and FIG. 9H, in one embodiment, a flow diagram of Step 825 expanded into sub-steps is shown.

As previously described, Step 825 involves the Network Manager assigning switch numbers to the NSBs. Step 825 includes the sub-steps described below.

The $i^{th}$ row of the NSB matrix contains the NSBs of sector i in correct relative order. The Network Manager assigns a switch number to each NSB in the NSB matrix according to the equation: NSB board number=((r*16)+c+1+192), where r is the row number and c is the column number of the NSB board in the NSB matrix (Step 955). The final switch number for the $j^{th}$ NSB within sector i is given by (((i−1)*16)+j+192). As each NSB is numbered, the Network Manager finds the Topology Table entry for the switch board and fills in the switch number.

Number the ISBs

Figure 9I:
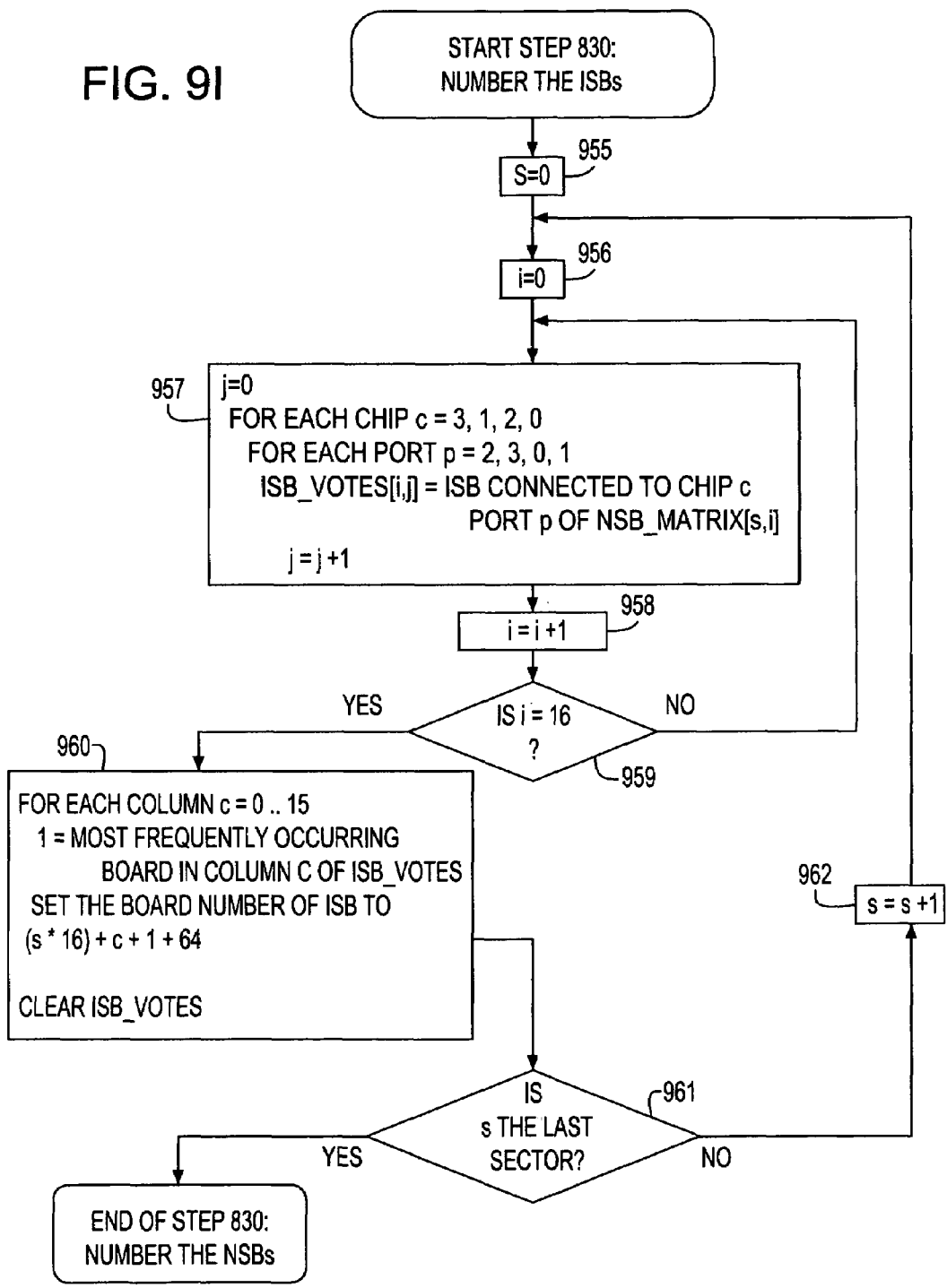

Referring to FIG. 8 and FIG. 9I, in one embodiment, a flow diagram of Step 830 expanded into sub-steps is shown. As previously described, Step 830 involves the Network Manager assigning ISB numbers using a similar methodology as described above and the properties of NSB to ISB connections. Step 830 includes the sub-steps described below.

The following steps (Steps 955 to 962) take advantage of the fact that, for an NSB, each external port of the switch chips 0-3 connects to an ISB which occupies a specific position within the sector. For example, switch chip three, port two connects to the first ISB of the sector, switch chip three, port three connects to the second ISB, switch chip one, port two connects to the ninth ISB, and so on. All sixteen NSBs of the sector should connect to the first ISB through chip three, port two. All sixteen NSBs should connect to the second ISB through chip three, port three, and so on. If more than one ISB is found connected through a given (chip, port) combination, the ISB to which the majority of the NSBs connect is given the relative ISB number within the sector.

The Network Manager first sets the sector S to be zero (Step 955), and then sets the index i to zero (Step 956). The Network Manager uses the NSBs in each row of the NSB matrix to identify the ISBs of each sector. The Network Manager, for each NSB i in the sector, puts a "vote" for each ISB j (the board connected to it via the appropriate (chip, port) combination) into a matrix ISB_votes[i,j] (Step 957). The Network Manager repeats step 957 (increments j) for all the ISBs connected to first NSB. The Network Manager then increments i and moves to the next NSB (Step 958). The Network Manager then checks to see if i has reached sixteen (the total number of ISB for sector S) (Step 959). If i has reached sixteen, the ISB_votes matrix is filled. If i is not sixteen, the Network Manager repeats step 957.

Once the ISB_votes matrix for the sector S is filled, the Network Manager selects the most frequently occurring ISB in each column of the ISB_votes matrix as the most likely candidate for the $j^{th}$ ISB of the sector and assigns this ISB a board number=((S*16)+C+1+64) (Step 960). Thus, the ISB to which the majority of the NSBs connect in the expected way is given the relative ISB number within the sector. The Network Manager then checks to see if S is the last sector (Step 961). If S is not the last sector, the Network Manager increments S to the next sector and returns to step 948 (Step 962). The final switch number for the $i^{th}$ ISB in sector S is given by (((S−1)*16)+i+64). As each ISB is numbered, the Network Manager finds the Topology Table entry for the switch board and fills in the switch number.

Number the JSBs

Referring to FIG. 8 and FIG. 9J, in one embodiment, a flow diagram of Step 835 expanded into sub-steps is shown. As previously described, Step 835 involves the Network Manager assigning numbers to the JSBs based on the way in which the ISBs of each sector are connected to the JSBs. Step 835 includes the sub-steps described below.

The first ISB of each sector is connected to JSB one via port zero of chips 0-3, connected to JSB two via port one of chips 0-3, and so on. Thus, the set of first ISBs from the eight sectors are used to identify JSBs 1-4. In a similar way the set of second ISBs are used to identify JSBs 5-8, and in general, the set of $i^{th}$ ISBs from the eight sectors are used to identify JSBs (((i−1)*4)+1) through (((i−1)*4)+4).

The Network Manager first sets a variable JSB_num=one and i=0 (the number used to increment the ISB matrix location) (Step 963). The Network Manager then sets sector S=zero and port p=0 (Step 964). Next, the Network Manager sets clears an array variable JSB_votes and sets a variable j=0 (Step 965). The Network Manager uses the ISBs in each row of the ISB matrix to identify the JSB numbers. The Network Manager, for the ith ISB in each sector, puts four "votes" for a given JSB (the board connected to it via the appropriate (chip, port) combinations) into an array JSB_votes[j . . . j+4] (Step 966). The Network Manager then increments S (Step 967). The Network Manager then checks to see if S has reached eight (the total number of sectors) (Step 968). If S has reached eight, the Network Manager assigns JSB_num to the most frequently occurring board in JSB_votes, increments JSB_num, and increments port p (Step 969). If S is not eight, the Network Manager returns to step 966.

The Network Manager checks to see if port p is greater than three (Step 970). If port p is not greater than three, the Network Manager returns to step 965. If port p is greater than three, the Network Manager increments i (Step 971). The Network Manager then checks to see if i is equal to sixteen (Step 972). If i is not equal to sixteen, the Network Manager returns to step 964. As each JSB is numbered, the Network Manager finds the Topology Table entry for the switch board and fills in the switch number.

N-Stage Switching Network

As previously mentioned, the above-described methodology topology discovery can be extended to apply to a network with more than three stages by constructing a network that has multiple stages of internal boards, with 256-endpoint sectors forming the first two stages.

Figure 2B:
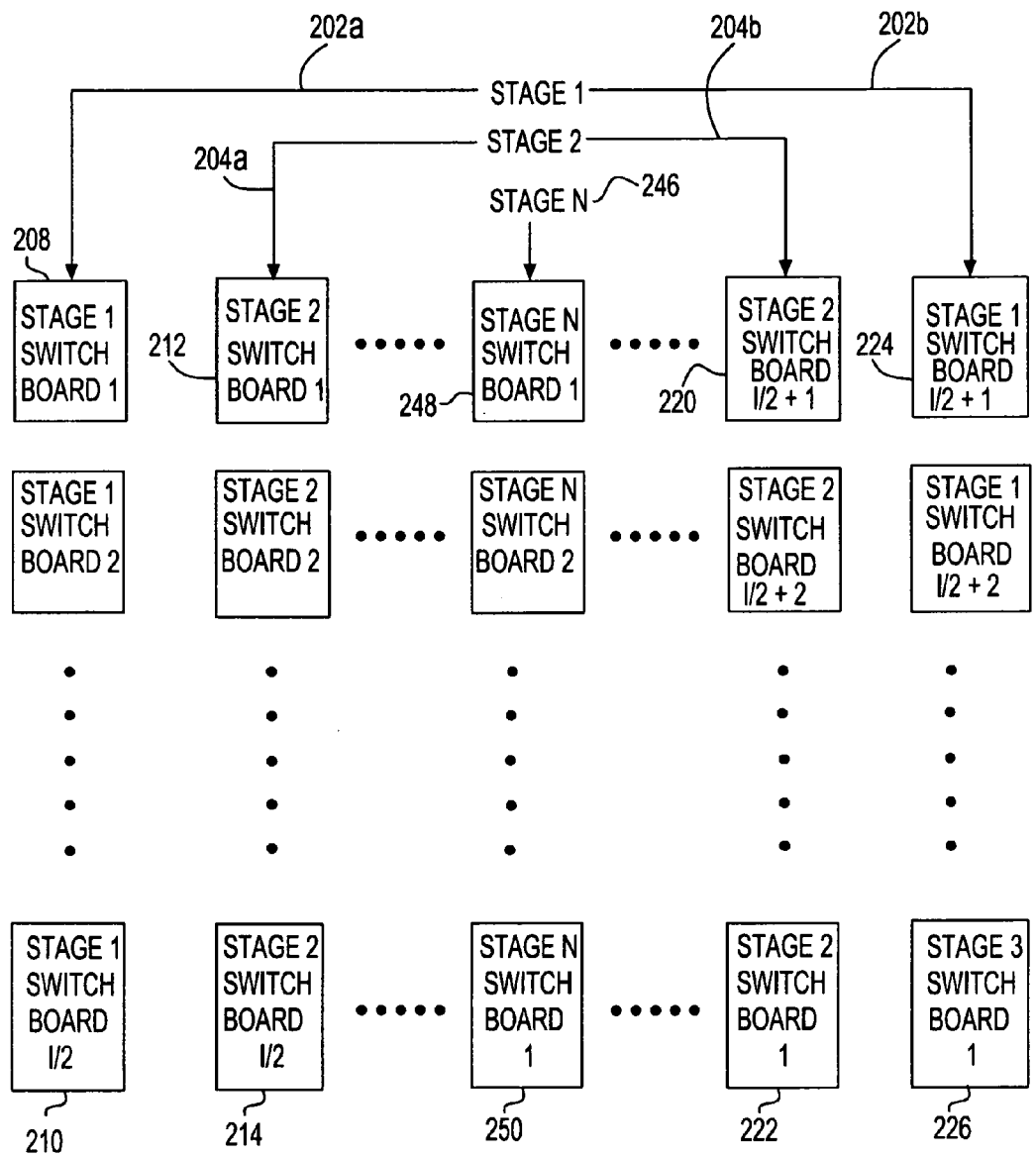
FIG. 2B is an illustrative block diagram of an N-stage switch network, according to one embodiment of the invention.

Described below is the method for topology discovery applied to an N-stage switch network. Certain characteristics of the switch network cabling are assumed to be met in the N-stage network. First, the N-stage network is constructed of 256-endpoint sectors including stages one and two that cabled as previously described. Second the positioning of the boards within the network is as shown in FIG. 2B and described in detail below. Third, the connection patterns between a board in stage S and each board of stage S+1 are regular and well defined.

Referring to FIG. 2B, a block diagram of an N-stage switching network is shown. A first half 202a of stage one includes switch board one 208 to switch board I/2 210, where I is the total number of switch boards in stage one. A second half 202b of stage one includes switch board (I/2+1) 224 to switch board I 226. A first half 204a of stage two includes switch board one 212 to switch board I/2 214, where I is the total number of switch boards in stage two. A second half 204b of stage two includes switch board (I/2+1) 220 to switch board I 222. Stage N 246 includes switch board one 248 to switch board I 250, where I is the total number switch boards in stage N. The first half 202a of stage one is interconnected to the first half 204a of stage two. The second half 202b of stage one is interconnected to the second half 204b of stage two. The first half 204a of stage two and the second half 204b of stage two are interconnected to stage three 226.

Figure 12:
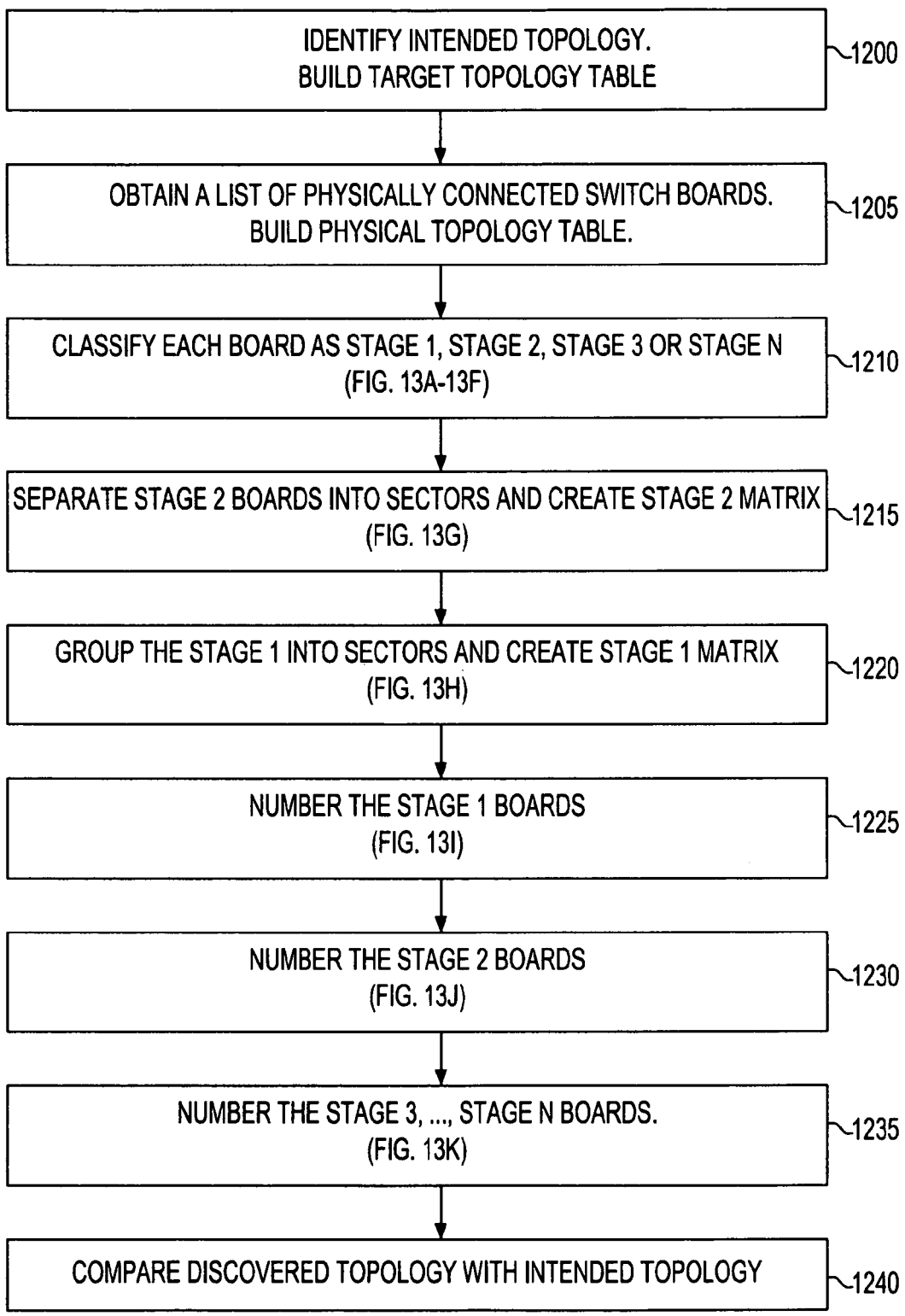
FIG. 12 is an illustrative flow diagram of an outline of a method for network topology discovery for an N-stage switch network, according to one embodiment of the invention.

Referring to FIG. 12, in one embodiment, a flow diagram describing an outline of the method for network topology discovery for an N-stage switch network is shown. Certain steps of the disclosed method will be described in further detail and shown in FIGS. 13A-9k.

The Network Manager (executing on the management server 105 shown in FIG. 1) identifies the intended topology that was stored on the management server 105 via the GUI (by the network installer) during network installation, builds a data structure (Target Topology Table) that includes connection information for the intended topology, and stores the Target Topology Table on the management server 105 (Step 1200).

The Target Topology Table is an array [1 . . . largest_switch_number], in which the connection data for switch number i is found in the $i^{th}$ entry. Each entry in the Target Topology Table has the following format:

--- chip_entry, an array [0..7] of type port_neighbor
type port_neighbor is an array [0..3] of
   integer neighbor_switch_number
   integer neighbor_chip_id
   integer neighbor_port_id.

---

The Target Topology Table defines, for any given switch chip, the switch number, switch chip ID and port ID for the expected neighbor of each external port on the switch board.

The Network Manager queries a Device Database (stored on the management server 105) to obtain a list of physically connected switch boards (i.e., physically present in the network 100 shown in FIG. 1), and issues queries to get the connection information for each link in the network 100. The Network Manager then uses this information to build a data structure referred to as the Physical Topology Table. The information is stored in the Physical Topology Table is stored in a format that can be easily used to compare the discovered topology to the intended topology (Step 1205).

The Physical Topology Table is an array [1 . . . number_of_switches] of type PhysicalEntry, described below.

A PhysicalEntry data type has the following fields:

--- integer switch_number (the switch number eventually assigned to this board)
integer frame_id (the frame in which this board resides)
integer slot_id (the slot in which this board resides)
chip_actual, an array [0..7] of type port_actual (neighbor IDs of ports 0-3 on 8 chips)
type port_actual is an array [0..3] of
   location_id neighbor_chip
   integer neighbor_port_id
type location_id contains
   integer frame_id
   integer slot_id
   integer chip_id

---

Hence, the Physical Topology Table includes, for each external port on each physical switch board, the information (switch board frame and slot, chip and port) that identifies the neighboring port. The switch number field in each entry is empty initially and is filled in by the topology discovery algorithm.

The Network Manager next classifies each switch board in the network 100 as stage 1 . . . stage N (Step 1210). The Network Manager then separates the stage 2 switch boards into sectors and creates a stage 2 matrix (Step 1215). The Network Manager next groups the stage 1 switch boards into sectors and creates a stage 1 matrix (Step 1220). The Network Manager then numbers the stage 1 switch boards (Step 1225). The Network Manager then numbers the stage 2 switch boards (Step 1230). The Network Manager next numbers the stage 3 . . . stage N switch boards (Step 1235). Finally, the Network Manager compares the discovered topology with the intended topology (Step 1240). The Network Manager steps through the Physical Topology Table, and for each entry, uses the entry's switch number to find the corresponding entry in the Target Topology Table. The Network Manager compares the neighbor information in the Target Topology Table entry with the neighbor information in the Physical Topology Table. If the neighbor switch number, switch chip ID or port ID differs, the Network Manager marks the physical link entry in the Device Database as incorrectly wired.

Classify Each Switch Board as Stage 1, Stage 2 . . . Stage N

Referring to FIG. 12 and FIGS. 13A to 13F, in one embodiment, a flow diagram of Step 1210 expanded into sub-steps is shown. As previously described, Step 1210 involves the Network Manager classifying each switch board in the network 100 as stage 1, stage 2 . . . stage N. Step 1210 includes the sub-steps described below.

Classify all Switch Boards on the Switch Board List as an OB (Outer Board) or IB (Inner Board)

Figure 13A:
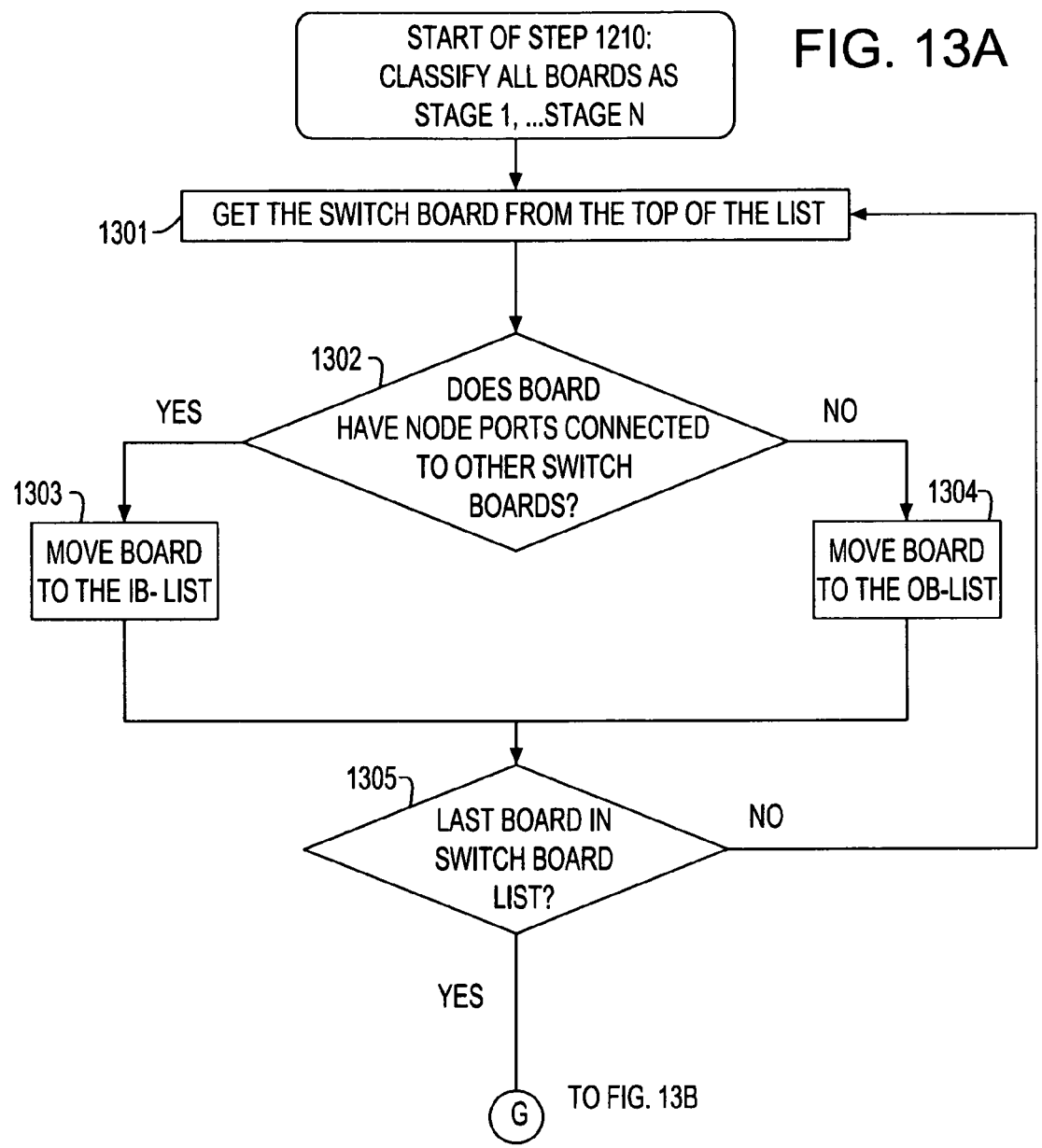

Referring to FIG. 13A, the following steps (Steps 1301-1305) take advantage of the fact that interior switch boards are the only switch boards that have node ports connected to other switch boards.

The Network Manager retrieves a switch board from the top of the switch board list (Step 1301). The Network Manager then examines physical connection information for the node ports of the board at the top of the switch board list to determine if the switch board has node ports connected to other switch boards (Step 1302). If the switch board has more than one node port connected to other switch boards, the switch board is moved to an IB (inner board) list (Step 1303). If the switch board does not have nodes connected to other switch boards, the switch board is moved to an OB list (outer board) (Step 1304). The Network Manager checks to see if the switch board is the last one in the switch board list (Step 1305). If it is not, the Network Manager returns to Step 1301. Steps 1301 to 1305 are repeated until all the switch boards on the switch board list are moved to either the IB list or the OB list.

Classify the Switch Boards on the OB List as Stage 1, Stage 2, or Unknown

Figure 13B:
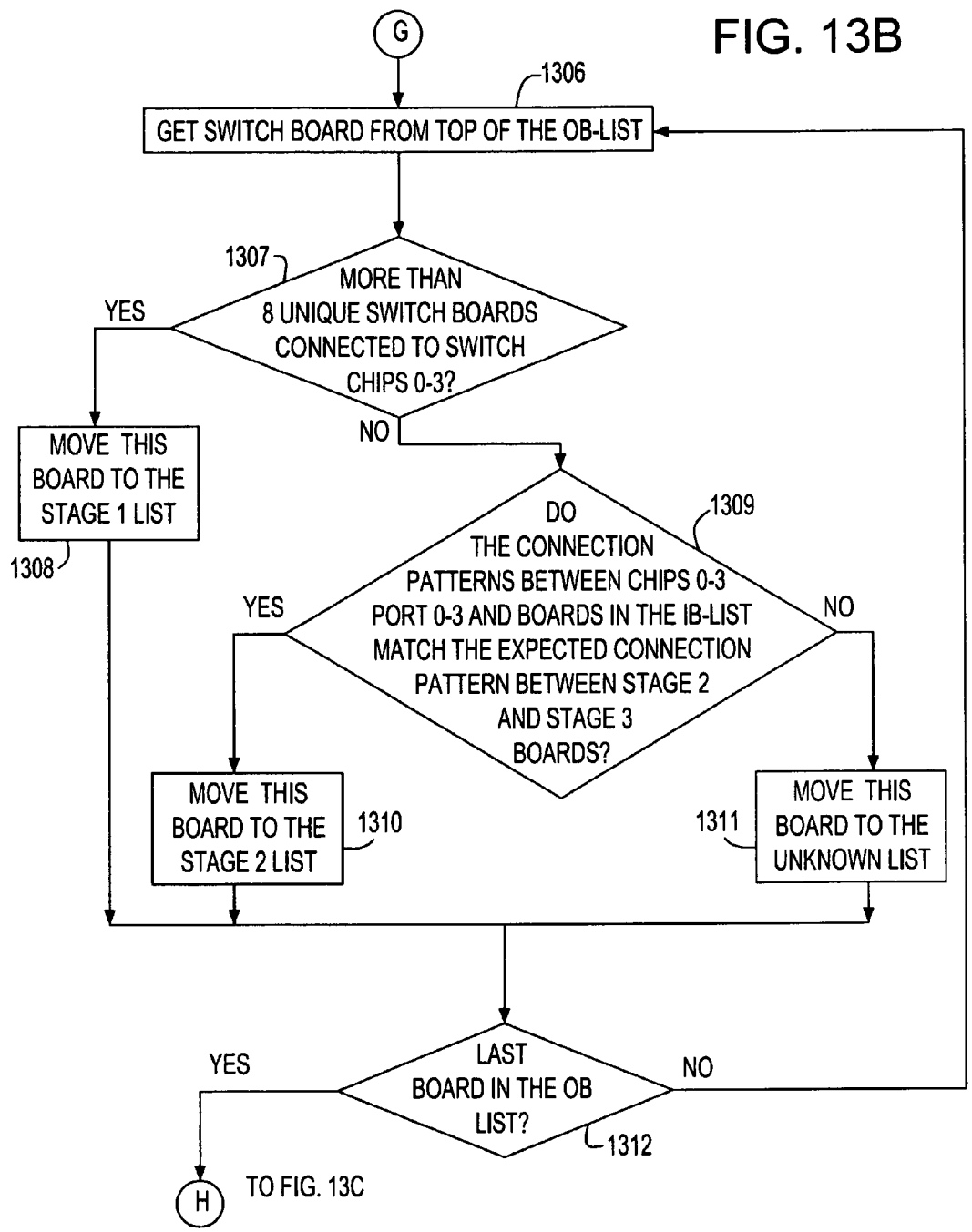

Referring to FIG. 13B, the following steps (Step 1306-1312) use the properties of stage 1 to stage 2 and stage 2 to stage 3 connections. A stage 1 switch board connects to sixteen different stage 2 boards via the distinct connections defined by switch chips 0-3 in combination with ports 0-3.

If the switch board is the last switch board in the switch board list, the Network Manager retrieves a switch board from the top of the OB list (Step 1306). The Network Manager examines the connections of the switch board at the top of the OB list to determine if it has connections to more than eight different switch boards via switch chips 0-3 (Step 1307). If the switch board does have connections to more than eight different switch boards, the Network Manager moves the switch board from the OB list to a stage 1 list (Step 1308).

If the switch board does not have connections to more than eight different switch boards, the Network Manager then determines if the connection patterns between switch chips 0-3 for ports 0-3 and switch boards on the IB list match expected connections patterns between stage 2 and stage 3 boards (Step 1309). If so, the Network Manager moves the switch board from OB list to the stage 2 list (Step 1310). If the switch board does not meet the criteria of step 1307 or step 1309, the Network Manager moves the switch board to an "unknown board type" list (Step 1311). The Network Manager checks to see if the switch board is the last one on the OB list (Step 1312). If it is not, the Network Manager returns to Step 1306. Steps 1306 to 1312 are repeated until all the switch boards on the OB list are moved to either the stage 1 list, stage 2 list, or the Unknown Board type list.

Attempt to Classify the Switch Boards on the IB List

Referring to FIG. 13C, the following steps (Steps 1312-1320) take advantage of the property that stage i switch chips 0-3 should connect to stage i+1 boards via chips 4-7, and use the fact that some boards have already been classified as stage i boards (starting with the stage 2 list created in steps 1306-1312). The following steps involve classifying the switch board on the IB list starting with stage 3 boards and identifying the switch boards from each stage in turn until the switch boards from all stages have been identified.

The network manager sets the stage number i=2 (Step 1313), and selects switch board S to be the first switch board in the stage i list (Step 1314). The Network Manager tries to identify the switch boards in the IB list as stage i+1 switch boards using the property that stage i board switch chips 0-3, ports 0-3 should connect to stage i+1 switch board chips 4-7, port 0-3 in the expected stage i to stage i+1 connection patterns, and the fact that some switch boards have already been classified as stage i boards. The Network Manager steps through the IB list to determine which boards in the IB list are connected through chips 0-3 ports 0-3 to boards in the stage i list in accordance with an expected stage i+1 to stage i connection pattern (Step 1315). The Network Manager moves any switch boards that meet the criteria of step 1315 from the IB list to the stage i+1 list (Step 1316). If the switch board does not meet the criteria of step 1315, the Network Manager moves the next board on the stage i list (Step 1317). The Network Manager determines if the switch board is the last switch board on the stage i list (Step 1318). If it is, the Network Manager increments i (Step 1319), and determines if i=N (Step 1320). If not, the Network Manager returns to step 1314.

Figure 13D:
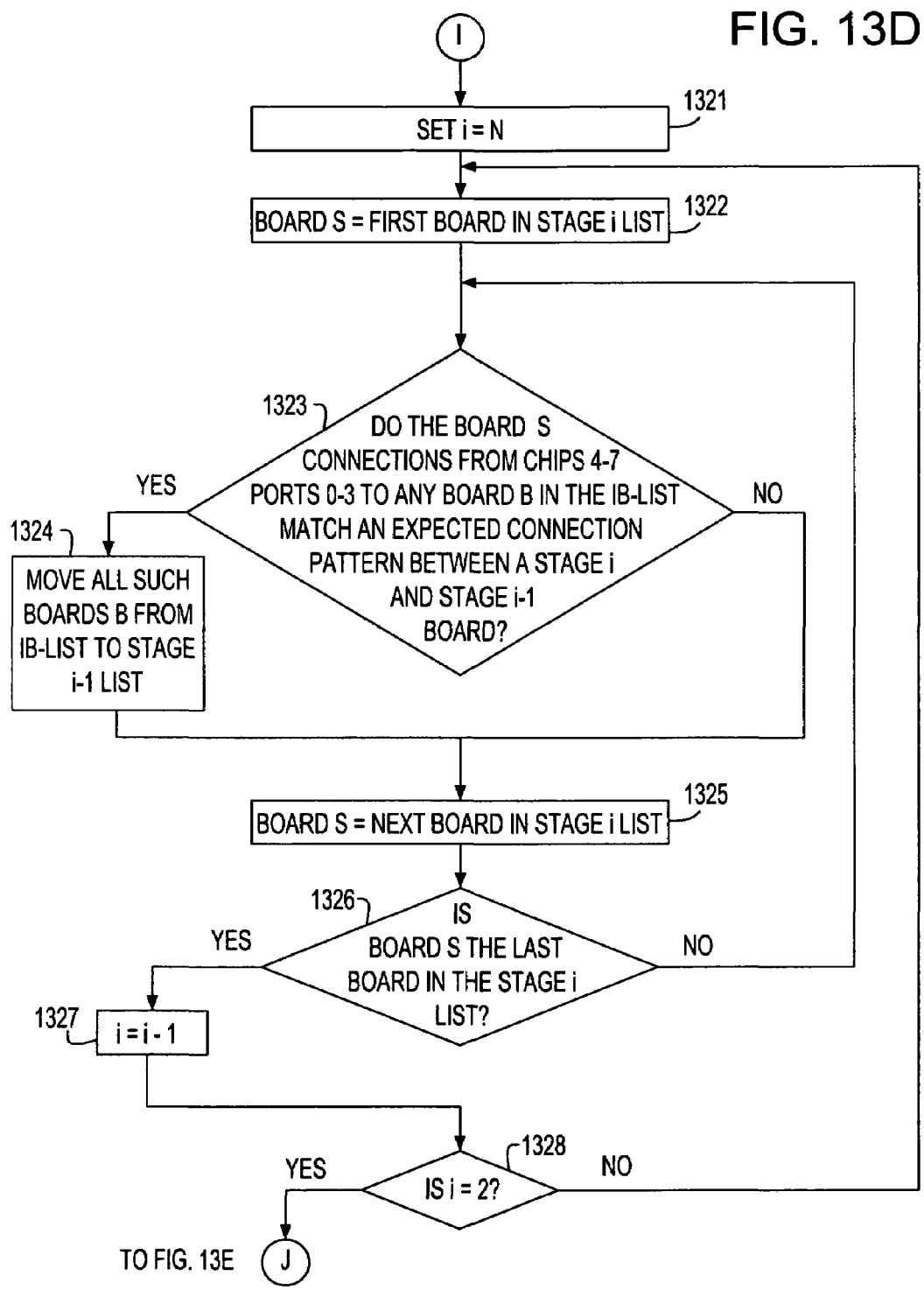

Referring to FIG. 13D, if there are any switch boards still on the IB list, the Network Manager works backwards through the stages using the already-classified lists for each stage to further classify boards on the IB list. The Network Manager tries to identify switch boards on the IB list as stage i−1 boards using expected connection patterns between chips 4-7, ports 0-3 of stage i boards and chips 0-3, ports 0-3 of stage i−1 boards.

The Network Manager sets the stage number=N (Step 1321), and selects switch board S to be the first switch board in the stage i list (Step 1322). The Network Manager steps through the IB list to determine which switch boards in the IB list are connected through chips 4-7, ports 0-3 to a switch board in the stage i list in an expected connection pattern between stage i−1 and stage i boards (Step 1323). The Network Manager moves any switch boards that meet the criteria of step 1323 from the IB list to the stage I−1 list (Step 1324). If the switch board does not meet the criteria of step 1323, the Network Manager moves to the next board on the stage i list (Step 1325). The Network Manager determines if the switch board is the last switch board on the stage i list (Step 1326). If it is, the Network Manager decrements i (Step 1327), and determines if i=2 (Step 1328). If not, the Network Manager returns to step 1323.

If the IB List is Non-Empty, Repeat Steps 1312 to 1328 One Time

Figure 13E:
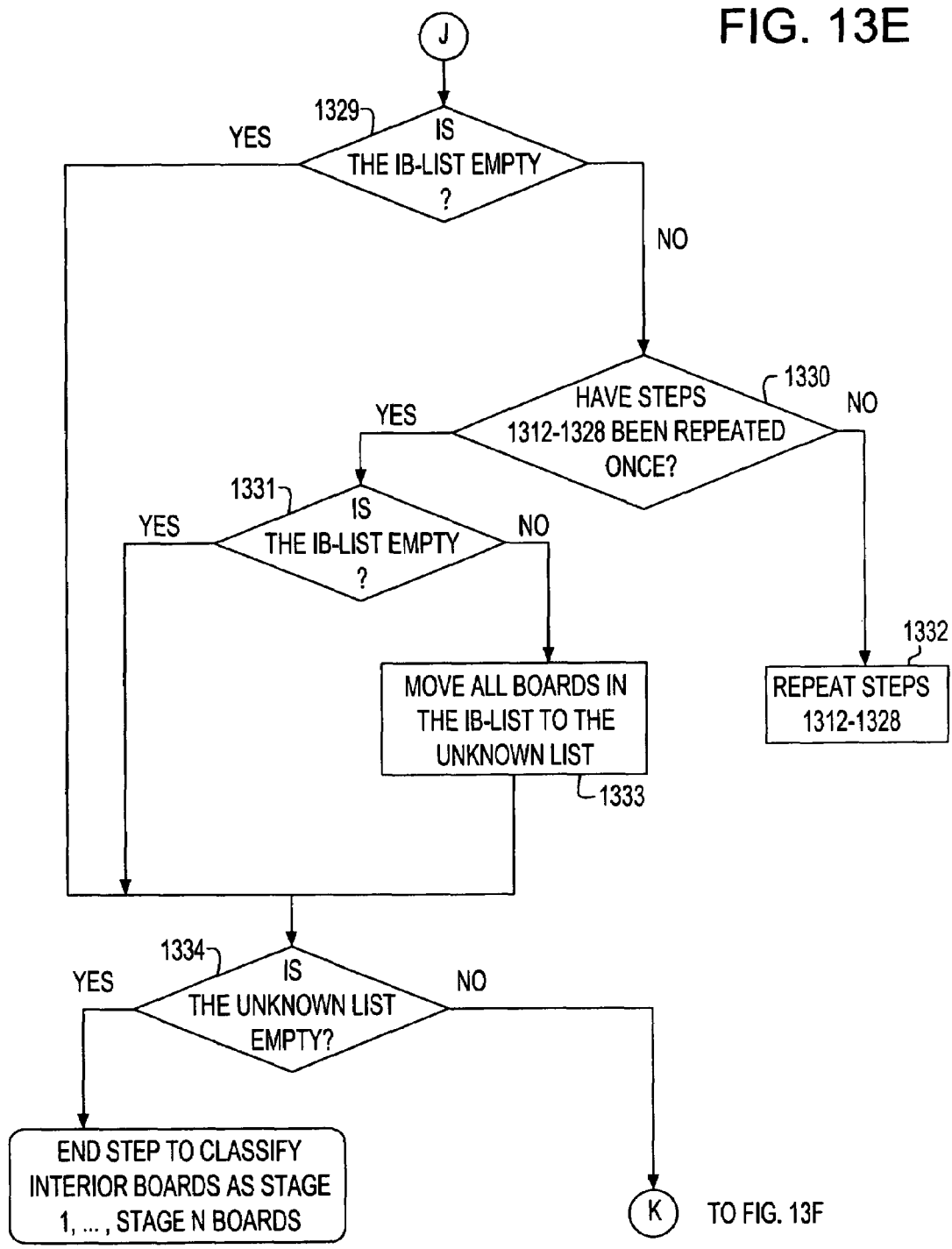

Referring to FIG. 13E, the Network Manager reads the IB list to determine if it is empty (Step 1329). If the IB list is not empty, the Network Manager determines if steps 1312 to 1328 have been repeated one time (Step 1330). If steps 1312 to 1328 have not been repeated once, the Network Manager repeats steps 1312 to 1328 (Step 1332). If step 1312 to 1328 have been repeated once, the Network Manager determines if the IB list is empty (Step 1331). If IB list is not empty, the Network Manager moves all the remaining switch boards on the IB list to the unknown board list (Step 1333). If the IB list is empty, the Network Manager determines if the unknown board list is empty (Step 1334).

Figure 13F:
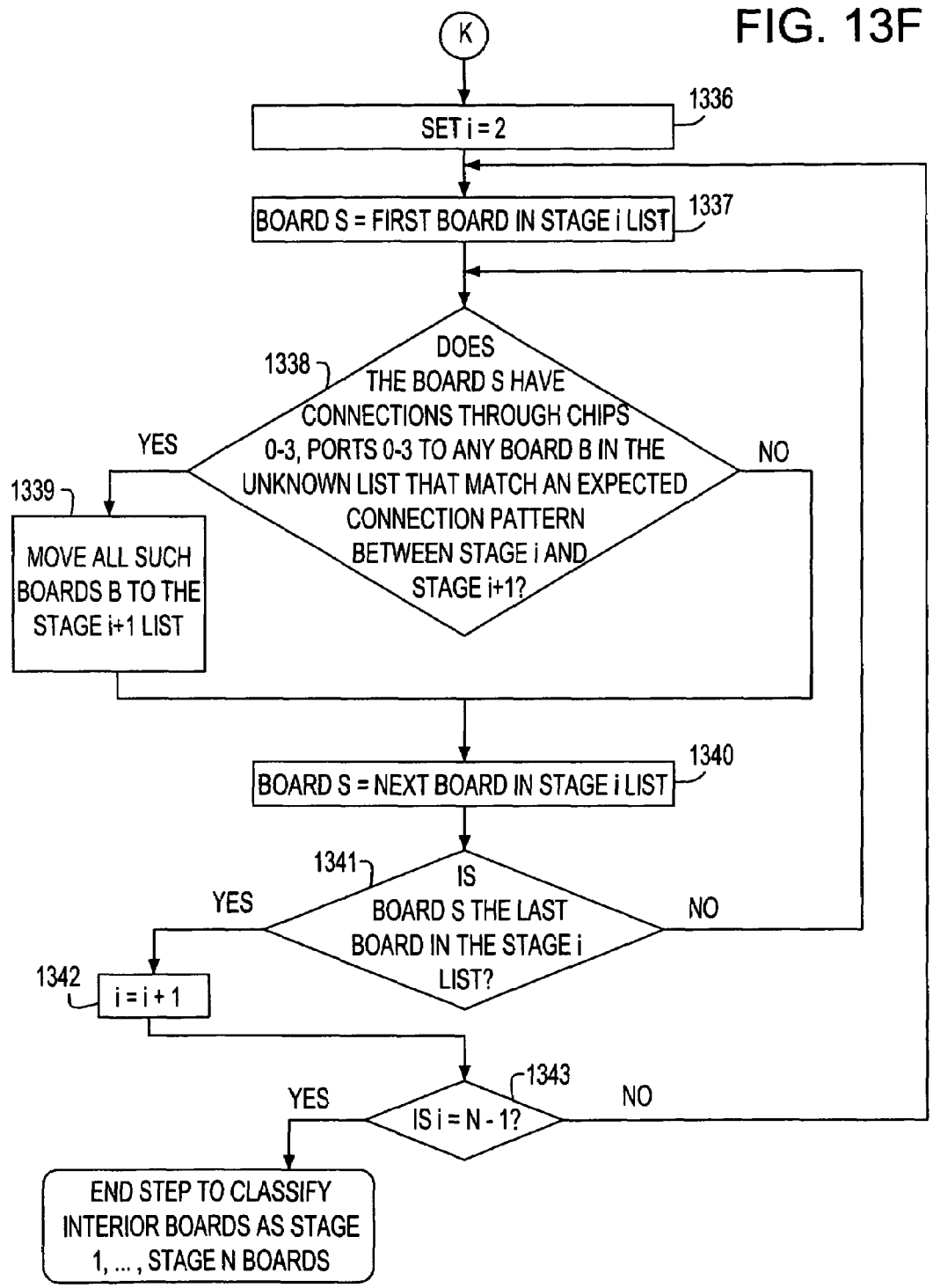

If the Unknown List is Non-Empty, Attempt to Classify the Switch Boards in the Unknown Board List Referring to FIG. 13F, If the unknown list is not empty, the Network Manager tries to identify the switch boards on the unknown board list.

The network manager sets the stage number i=2 (Step 1336), and selects switch board S to be the first switch board in the stage i list (Step 1337). The Network Manager identifies the switch boards in the unknown board list as stage i+1 boards by inspecting their chips 4-7, ports 0-3 connections to chips 0-3, ports 0-3 of switch boards in the stage i list to see if they match an expected connection pattern between stage i and stage i+1 (Step 1338). The Network Manager moves any switch boards that meet the criteria of step 1338 from the unknown board list to the stage i+1 list (Step 1339). If the switch board does not meet the criteria of step 1315, the Network Manager moves to the next board on the stage i list (Step 1340). The Network Manager determines if the switch board is the last switch board on the stage i list (Step 1341). If it is, the Network Manager increments i (Step 1342), and determines if i=N−1 (Step 1343). If not, the Network Manager returns to step 1337.

Group Stage 2 Switch Boards into Sectors and Create a Stage 2 Matrix

Figure 13G:
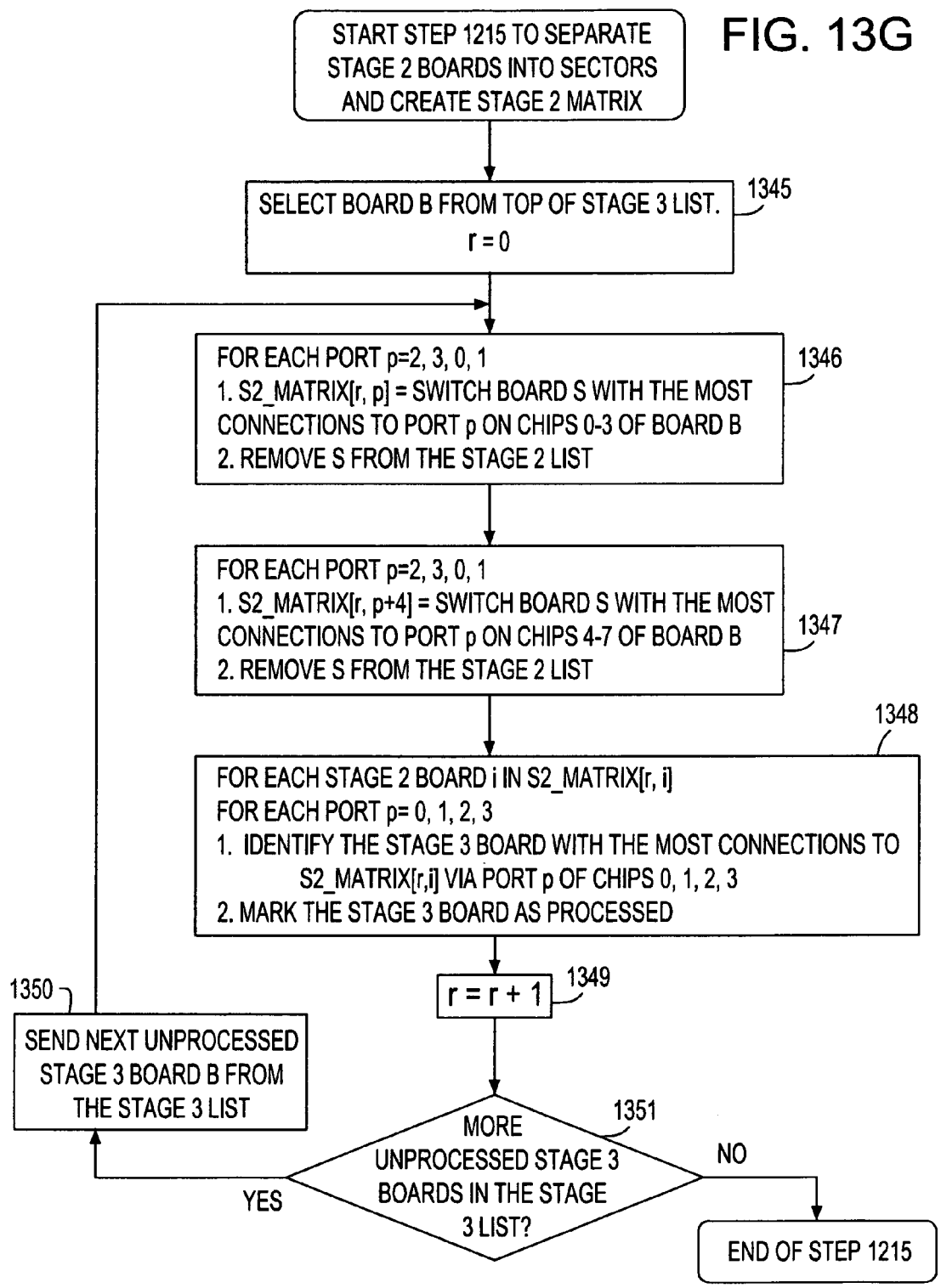

Referring to FIGS. 8 and 13G, in one embodiment, a flow diagram of Step 1215 expanded into sub-steps is shown. As previously described, Step 1215 involves the Network Manager separating the stage 2 switch boards into sectors and creating a stage 2 matrix 1000. Step 1215 includes the sub-steps described below.

The Network Manager picks a switch board B at the top of the stage 3 list and starts at row zero (set row counter to zero) of the stage 2 matrix (Step 1345). The Network Manager uses the four connection patterns of the switch chips 0-3, ports 0-3 to identify four stage 2 switch boards, populates the first four entries of row zero of the stage 2 matrix, and removes the stage 2 switch boards from the stage 2 list (Step 1346). The Network Manager then uses the four connection patterns of the switch chips 4-7, ports 0-3 to identify four more stage 2 switch boards, adds them to row zero of the stage 2 matrix, and removes the stage 2 switch boards from the stage 2 list (Step 1347).

The Network Manage then uses the eight stage 2 boards in the stage 2 matrix to identify four more stage 3 boards via the four connections patterns mentioned above (switch chips 0-3, ports 0-3), and marks the stage 3 list entries for the four identified stage 3 boards as processed to remove them from further consideration (Step 1348). The Network Manager then increments the row counter (Step 1349). The Network Manager next checks the stage 3 list for the next unprocessed stage 3 board (Step 1351). If there is an unprocessed stage 3 board in the stage 3 list, the Network Manager returns to step 1346 and populates the second row of the stage 2 matrix (Step 1350). When the stage 3 list has been completely processed, the first column of the stage 2 matrix will contain the sector one stage 2 boards, the second column will contain the sector two stage 2 boards, and so on.

Group Stage 1 Switch Boards into Sectors and Create a Stage 1 Matrix

Figure 13H:
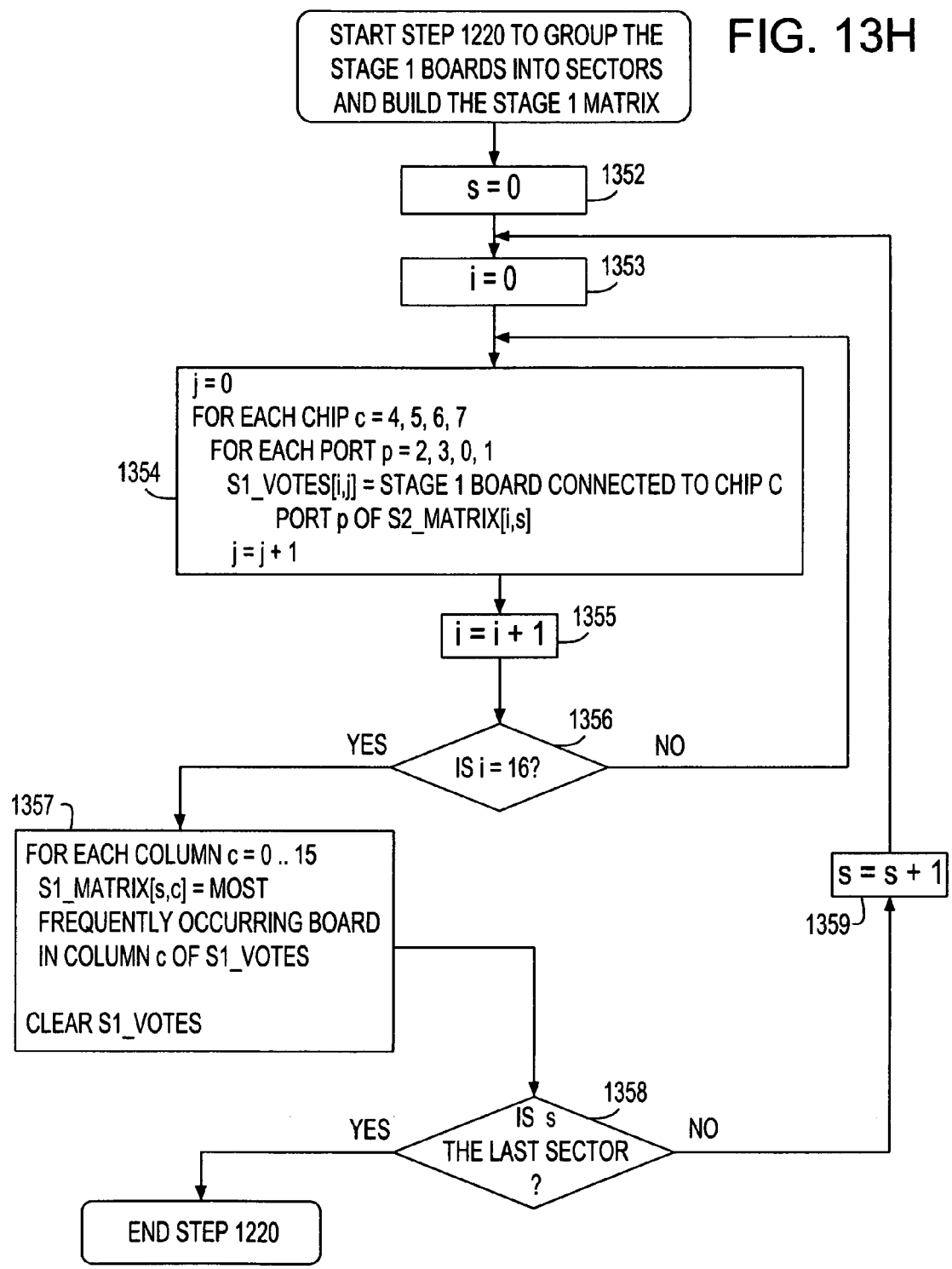

Referring to FIGS. 12 and 13H, in one embodiment, a flow diagram of Step 1220 expanded into sub-steps is shown. As previously described, Step 1220 involves the Network Manager grouping the stage 1 boards according to sector and building a stage 1 matrix. Step 1220 includes the sub-steps described below.

The Network Manager first sets the sector S to be zero (Step 1352), and then sets the index i to zero (Step 948). The Network Manager uses the stage 2 boards in each column of the stage 2 matrix to identify the stage 1 boards of each sector. The Network Manager, for each stage 2 board i in the sector, puts a "vote" for each stage 1 board j (the board connected to it via the appropriate (chip, port) combination) into a matrix S1_votes[i,j] (Step 1354). The Network Manager repeats step 1354 (increments) for all the stage 1 boards connected to the first stage 2 board. The Network Manager then increments i and moves to the next stage 2 board (Step 1355). The Network Manager then checks to see if i has reached sixteen (the total number of stage 2 boards for sector S) (Step 1356). If i has reached sixteen, the S1_votes matrix is filled. If i is not sixteen, the Network Manager repeats step 1354.

Once the S1_votes matrix for the sector S is filled, the Network Manager selects the most frequently occurring stage 1 board in each column of the S1_votes matrix as the most likely candidate for the $j^{th}$ stage 1 board of the sector (Step 1357). Thus, the stage 1 board to which the majority of the stage 2 board connect in the expected way is given the relative stage 1 number within the sector. The Network Manager then checks to see if S is the last sector (Step 1358). If S is not the last sector, the Network Manager increments S to the next sector and returns to step 1352 (Step 1359). As each set of sixteen stage 1 boards is identified, the Network Manager puts them into a stage 1 matrix of eight rows and sixteen columns, where the $i^{th}$ row contains the 16 stage 1 boards of sector i.

Number the Stage 1 Switch Boards

Figure 13I:
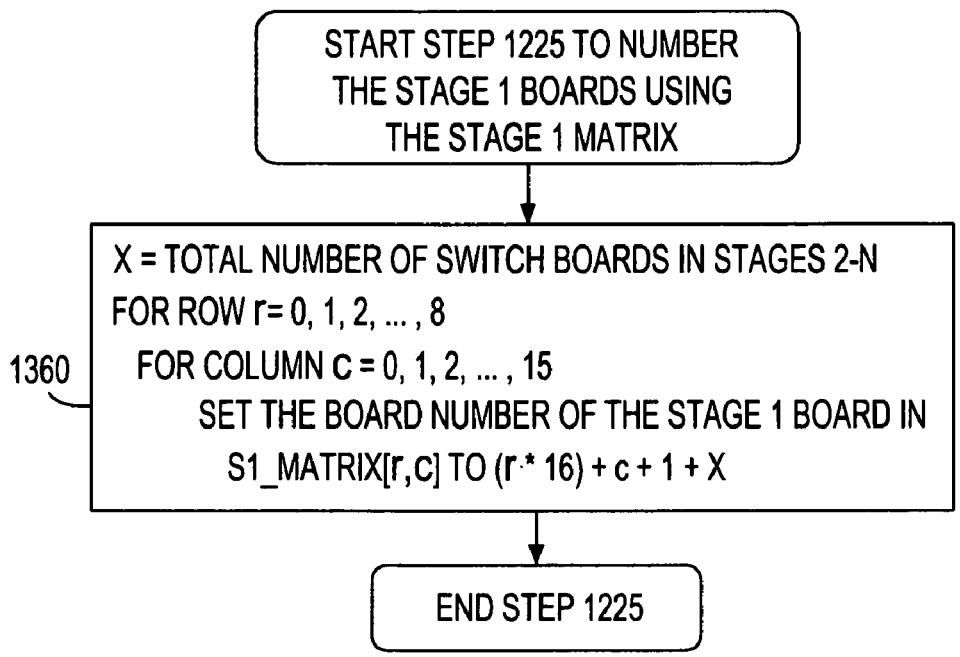

Referring to FIGS. 12 and 13I, in one embodiment, a flow diagram of Step 1225 expanded into sub-steps is shown. As previously described, Step 1225 involves the Network Manager assigning switch numbers to the stage 1 boards. Step 1225 includes the sub-steps described below.

The $i^{th}$ row of the NSB matrix contains the stage 1 boards of sector i in correct relative order. The Network Manager assigns a switch number to each stage 1 board in the stage 1 matrix according to the equation: stage 1 board number= ((r*16)+c+1+X), where r is the row number and c is the column number of the stage 1 board in the stage 1 matrix, and X is the total number of switch boards in stages 2-N (Step 1360). The final switch number for the $j^{th}$ stage 1 board within sector i is given by (((i−1)*16)+j+X). As each stage 1 board is numbered, the Network Manager finds the Topology Table entry for the switch board and fills in the switch number.

Number the Stage 2 Switch Boards

Figure 13J:
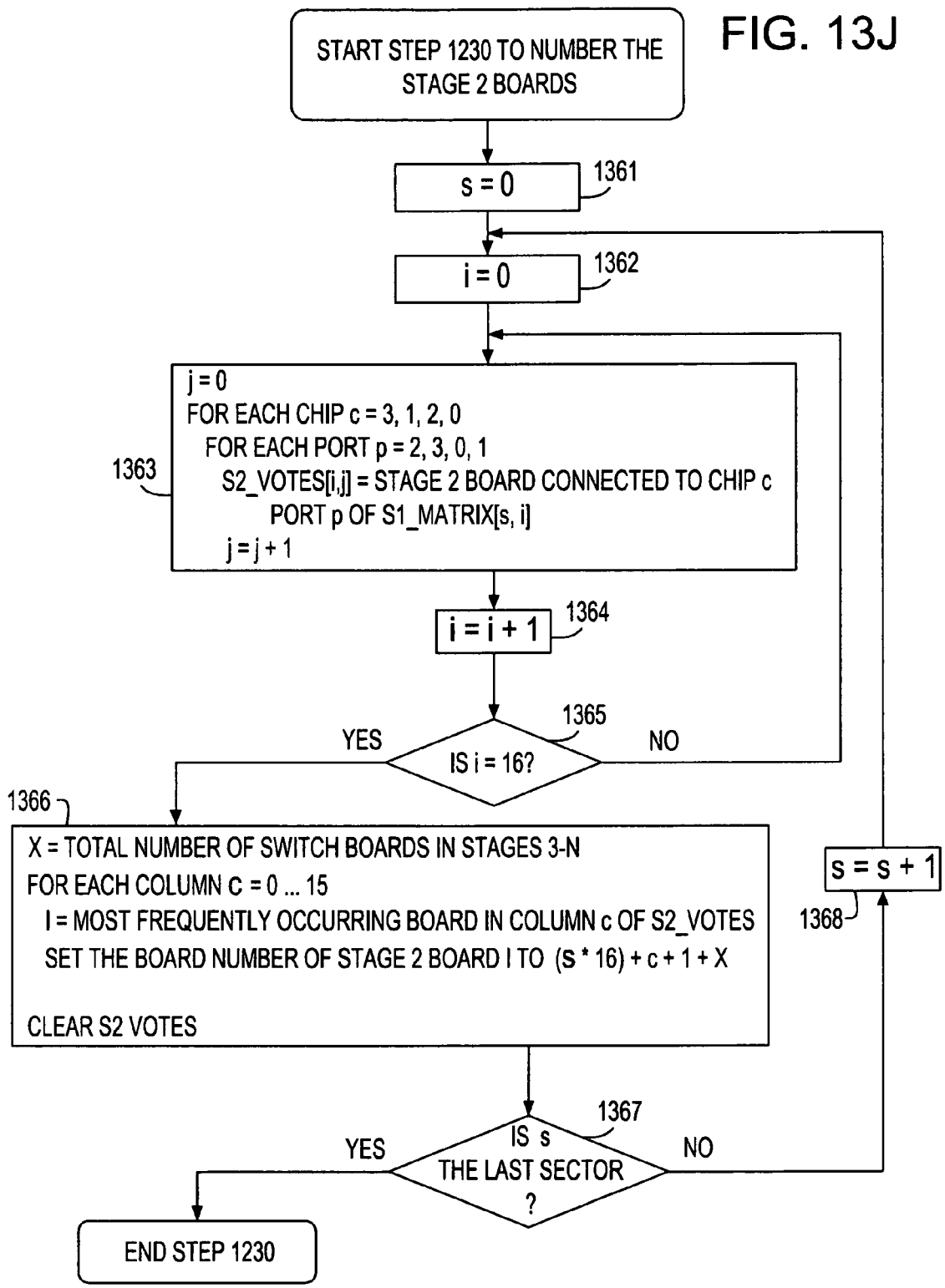

Referring to FIGS. 12 and 13J, in one embodiment, a flow diagram of Step 1230 expanded into sub-steps is shown. As previously described, Step 1230 involves the Network Manager assigning stage 1 switch board numbers using a similar methodology as described above and the properties of stage 1 to stage 2 connections. Step 1230 includes the sub-steps described below.

The Network Manager first sets the sector S to be zero (Step 1361), and then sets the index i to zero (Step 1362). The Network Manager uses the stage 1 boards in each row of the stage 1 matrix to identify the stage 2 boards of each sector. The Network Manager, for each stage 1 board i in the sector, puts a "vote" for each stage 2 j (the board connected to it via the appropriate (chip, port) combination) into a matrix S2_vote[i,j] (Step 1363). The Network Manager repeats step 1363 (increments j) for all the stage 2 boards connected to the first stage 1 board. The Network Manager then increments i and moves to the next stage 1 board (Step 1364). The Network Manager then checks to see if i has reached sixteen (the total number of stage 2 boards for sector S) (Step 1365). If i has reached sixteen, the S2_votes matrix is filled. If i is not sixteen, the Network Manager repeats step 1363.

Once the S2_votes matrix for the sector S is filled, the Network Manager selects the most frequently occurring stage 2 board in each column of the S2_votes matrix as the most likely candidate for the $j^{th}$ stage 2 board of the sector and assigns this stage 2 board a board number=((S*16)+C+1+X), where X is the total number of switch boards in stages 3-N (Step 1366).

Thus, the stage 2 board to which the majority of the stage 1 boards connect in the expected way is given the relative stage 2 board number within the sector. The Network Manager then checks to see if S is the last sector (Step 1367). If S is not the last sector, the Network Manager increments S to the next sector and returns to step 1362 (Step 1368). The final switch number for the $i^{th}$ stage 2 board in sector S is given by (((S−1)*16)+i+X). As each stage 2 board is numbered, the Network Manager finds the Topology Table entry for the switch board and fills in the switch number.

Number the Stage 3 . . . Stage N Boards

Figure 13K:
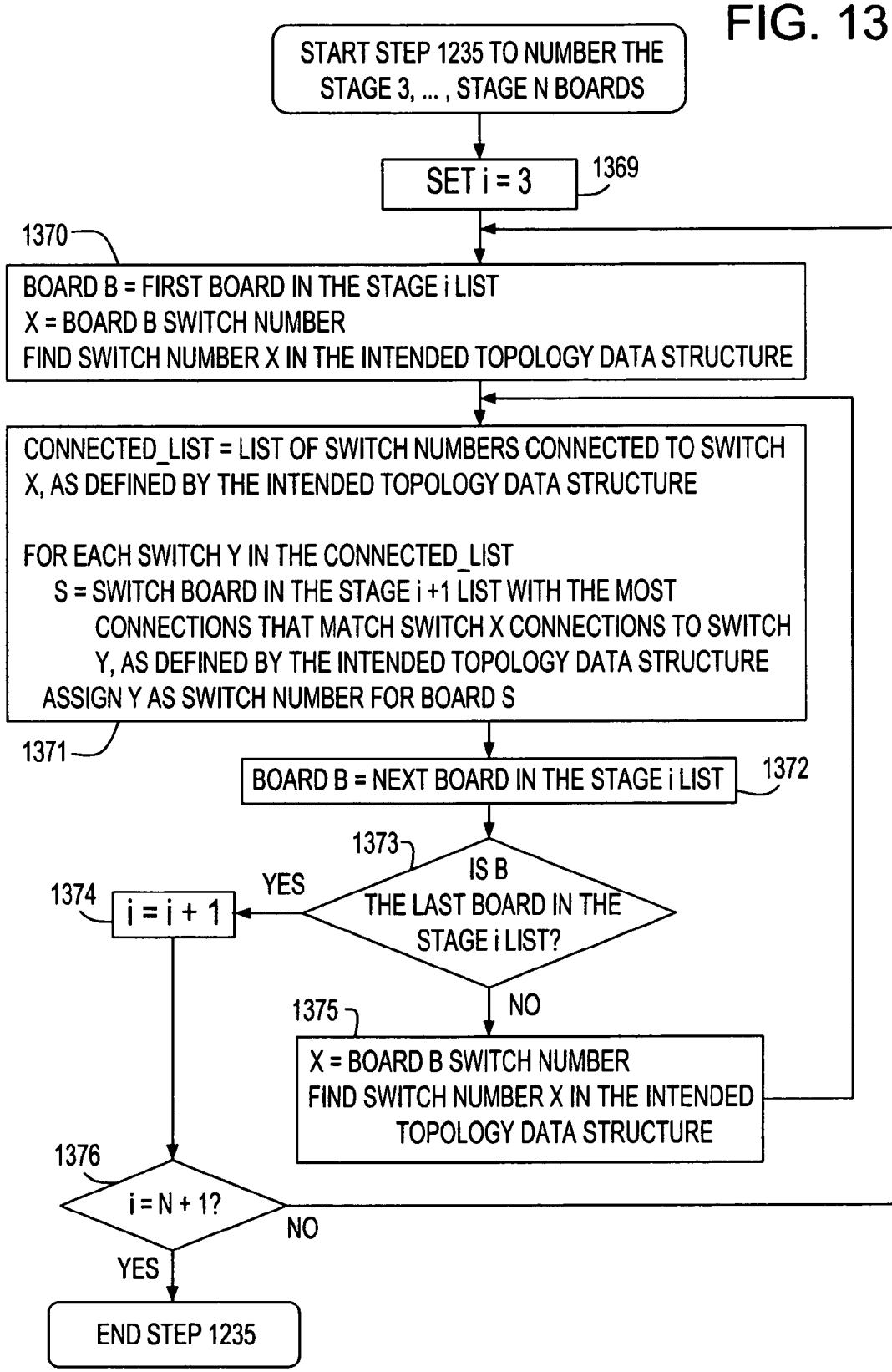

Referring to FIG. 12 and FIG. 13K, in one embodiment, a flow diagram of Step 1235 expanded into sub-steps is shown. As previously described, Step 1235 involves the Network Manager assigning numbers to the stage 3 . . . N. Step 1235 includes the sub-steps described below.

The Network Manager, starting with stage 2, uses the switch numbers previously assigned to the switch boards, in conjunction with the connection patterns between the previously numbered switch boards and the switch boards in the next stage, to number the switch boards in the next stage.

The Network Manage sets the stage number i=2 (Step 1369). The Network Manager selects switch board B as the first board in the stage i list, sets X to be the board switch number, and finds the switch number X from the Intended Topology Data Structure (Step 1370). Next the Network Manager obtains the "connected_list", which is a list of the stage i+1 switch numbers that are connected to switch X, as defined by the Intended Topology Data Structure. For each switch Y in the connected_list, the Network Manager determines which switch board in the stage i+1 list has the most connections matching the expected connection patterns between switch X of stage i and switch Y of stage i+1. The Network Manager then assigns switch number Y to that switch board (Step 1371). The Network Manager then moves to the next board B in the stage i list (Step 1372). The Network Manage then determines if board B is the last board in the stage i list (1373). If it is not, the Network Manager determines the board B switch number X from the intended topology data structure (Step 1375) and returns to step 1371. If board B is the last board in the stage i list, the Network Manager increments i (Step 1374). The Network Manager then determines if I=N−1 (Step 1376). If not, the Network Manager returns to step 1370.

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A method of discovering a topology and identifying switches in an N-stage switch network comprising a plurality of interconnected switch boards, the method comprising:
   (i) ascertaining an intended topology of the N-stage switch network;
   (ii) creating a list of the plurality of switch boards that are present in the N-stage switch network;
   (iii) determining a connection pattern for each of the plurality of switch boards by obtaining information indicating how each of the plurality of switch boards is connected to neighboring switch boards;
   (iv) classifying each of the plurality of switch boards on the list of the plurality of switch boards as an outer switch board (OB), or an inner switch board (IB), and creating a respective OB list of the switch boards characterized as a OB, and creating a respective IB list of the switch boards characterized as an IB;
   (v) classifying each of the switch boards on the OB list as a stage 1 switch board, stage 2 switch board, or unknown;
   (vi) classifying each of the switch boards on the IB list as one of a stage 3 switch board to a stage N switch board;
   (vii) grouping the stage 2 switch boards into sectors;
   (viii) grouping the stage 1 switch boards into sectors; and
   (ix) determining a number for each switch board in stages 1 to N, thereby determining the topology of the N-stage switch network; and
   using a management server computer, executing a switch network manager program stored in a storage medium, to perform the step of determining the connection pattern for each of the plurality of switch boards by obtaining information indicating how each of the plurality of switch boards is connected to neighboring switch boards.

2. The method of claim 1 wherein determining a number for each stage 2 switch board comprises using information about stage 2 to stage 1 connections and a sector ID to assign a number to each stage 1 switch board.

3. The method of claim 1 wherein determining a number for each stage 1 switch board comprises using information about stage 1 to stage 2 connections and a sector ID to assign a number to each stage 2 switch board.

4. The method of claim 1 wherein determining a number for each stage 3 to stage N switch board comprises using information about the numbers assigned to switch boards in a previous stage, and connections between switch boards in the previous stage to switch boards in a next stage to number each stage 3 to stage N switch board.

5. The method of claim 1 wherein creating a list of the plurality of switch boards that are in communication with the N-stage switch network comprises reading a plurality of registers on each of the plurality of switch boards.

6. The method of claim 1 wherein obtaining information indicating how each switch board is connected to neighboring switch boards comprises reading a plurality of registers on each of the plurality of switch boards and retrieving the information indicating how each switch board is connected to neighboring switch boards.

7. The method of claim 1 wherein ascertaining an intended topology of the N-stage switch network comprises retrieving from a memory a previously selected topology.

8. The method of claim 1 further comprising validating the determined topology by comparing the determined topology to the intended topology.

9. A program storage device readable by a machine, tangibly embodying a program of instructions executable by the machine to perform method steps for discovering a topology and identifying switches in an N-stage switch network comprising a plurality of interconnected switch boards, the method steps comprising:
   (i) ascertaining an intended topology of the N-stage switch network;
   (ii) creating a list of the plurality of switch boards that are present in the N-stage switch network;
   (iii) determining a connection pattern for each of the plurality of switch boards by obtaining information indicating how each of the plurality of switch boards is connected to neighboring switch boards;
   (iv) classifying each of the plurality of switch boards on the list of the plurality of switch boards as one of an outer switch board (OB), or an inner switch board (IB), and creating a respective OB list of the switch boards characterized as a OB, and creating a respective IB list of the switch boards characterized as an IB;
   (v) classifying each of the switch boards on the OB list as a stage 1 switch board, stage 2 switch board, or unknown;
   (vi) classifying each of the switch boards on the IB list as one of a stage 3 switch board to a stage N switch board;
   (vii) grouping the stage 2 switch boards into sectors;
   (viii) grouping the stage 1 switch boards into sectors; and
   (ix) determining a number for each switch board in stages 1 to N, thereby determining the topology of the N-stage switch network.

10. The program storage device of claim 9 wherein determining a number for each stage 2 switch board comprises using information about stage 2 to stage 1 connections and a sector ID to assign a number to each stage 1 switch board.

11. The program storage device of claim 9 wherein determining a number for each stage 1 switch board comprises using information about stage 1 to stage 2 connections and a sector ID to assign a number to each stage 2 switch board.

12. The program storage device of claim 9 wherein determining a number for each stage 3 to stage N switch board comprises using information about the numbers assigned to switch boards in a previous stage, and connections between switch boards in the previous stage to switch boards in a next stage to number each stage 3 to stage N switch board.

13. The program storage device of claim 9 wherein creating a list of the plurality of switch boards that are in communication with the N-stage switch network comprises reading a plurality of registers on each of the plurality of switch boards.

14. The program storage device of claim 9 wherein obtaining information indicating how each switch board is connected to neighboring switch boards comprises reading a plurality of registers on each of the plurality of switch boards and retrieving the information indicating how each switch board is connected to neighboring switch boards.

15. The program storage device of claim 9 wherein ascertaining an intended topology of the N-stage switch network comprises retrieving from a memory a previously selected topology.

16. The program storage device of claim 9 further comprising validating the determined topology by comparing the determined topology to the intended topology.

17. A system for discovering a topology and identifying switches in an N-stage switch network comprising a plurality of interconnected switch boards, the system comprising a server computer configured for:
   ascertaining an intended topology of the N-stage switch network;
   creating a list of the plurality of switch boards that are present in the three-stage switch network;
   determining a connection pattern for each of the plurality of switch boards by obtaining information indicating how each of the plurality of switch boards is connected to neighboring switch boards;
   classifying each of the plurality of switch boards on the list of the plurality of switch boards as one of an outer switch board (OB), or an inner switch board (IB), and creating a respective OB list of the switch boards characterized as a OB, and creating a respective IB list of the switch boards characterized as an IB;
   classifying each of the switch boards on the OB list as a stage 1 switch board, stage 2 switch board, or unknown;
   classifying each of the switch boards on the IB list as one of a stage 3 switch board to a stage N switch hoard;
   grouping the stage 2 switch boards into sectors;
   grouping the stage 1 switch boards into sectors; and
   determining a number for each switch board in stages 1 to N, thereby determining the topology of the N-stage switch network.

18. The system of claim 17 wherein the server computer is further configured for validating the determined topology by comparing the determined topology to the intended topology.

19. The system of claim 17 wherein the server computer includes a graphical user interface for ascertaining the intended topology of the N-stage switch network and said graphical user interface is configured to receive input from a network installer.

20. The system of claim 17 wherein the server computer is in communication with the N-stage switch network.

* * * * *